(12) United States Patent
Banka et al.

(10) Patent No.: US 11,658,874 B2
(45) Date of Patent: *May 23, 2023

(54) ASSESSMENT OF OPERATIONAL STATES OF A COMPUTING ENVIRONMENT

(71) Applicant: Juniper Networks, Inc., Sunnyvale, CA (US)

(72) Inventors: Tarun Banka, Milpitas, CA (US); Harshit Naresh Chitalia, Sunnyvale, CA (US); Travis Gregory Newhouse, Encinitas, CA (US); Chaitanya Pemmaraju, Fremont, CA (US); Pawan Prakash, San Francisco, CA (US); Parantap Roy, Mountain View, CA (US); Sumeet Singh, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,626

(22) Filed: May 13, 2019

(65) Prior Publication Data

US 2019/0268228 A1     Aug. 29, 2019

Related U.S. Application Data

(63) Continuation of application No. 14/811,957, filed on Jul. 29, 2015, now Pat. No. 10,291,472.

(51) Int. Cl.
*G06F 15/16* (2006.01)
*H04L 41/0866* (2022.01)
(Continued)

(52) U.S. Cl.
CPC ...... *H04L 41/0866* (2013.01); *H04L 41/0893* (2013.01); *H04L 43/14* (2013.01);
(Continued)

(58) Field of Classification Search
CPC ............. G06F 11/3409; G06F 11/3433; G06F 2009/4557; G06F 2009/45595;
(Continued)

(56) References Cited

U.S. PATENT DOCUMENTS

D379,695 S      6/1997  Africa
6,182,157 B1 *  1/2001  Schlener ............. H04L 41/0213
                                                   709/202
(Continued)

FOREIGN PATENT DOCUMENTS

CN        1787424 A      6/2006
CN      102045537 A      5/2011
(Continued)

OTHER PUBLICATIONS

A Model Driven Engineering Approach for Flexible and Distributed Monitoring of Cross-Cloud Applications Daniel Baur 2018 IEEE/ACM 11th International Conference on Utility and Cloud Computing (UCC) (Year: 2018).*

(Continued)

*Primary Examiner* — Oscar A Louie
*Assistant Examiner* — Oluwatosin M Gidado
(74) *Attorney, Agent, or Firm* — Shumaker & Sieffert, P.A.

(57) ABSTRACT

A system that permits or otherwise facilitates assessment of operational state of a computing component in a computing environment. In one example, this disclosure describes a method that includes collecting, by a server device that is executing within a server device cluster, metric information indicative of an operational state of the server device, wherein the metric information is associated with a plurality of virtual computing instances executing on the server device; analyzing, by the server device and based on the metric information, whether a first condition associated with (Continued)

a first virtual computing instance is satisfied; analyzing, by the server device and based on the metric information, whether a second condition associated with a second virtual computing instance is satisfied; and updating control information characterizing the operational state of the server device executing within the server device cluster.

16 Claims, 15 Drawing Sheets

(51) Int. Cl.
*H04L 43/00* (2022.01)
*H04L 41/0893* (2022.01)
*H04L 41/085* (2022.01)
*H04L 43/0817* (2022.01)
*H04L 43/16* (2022.01)
*H04L 43/0876* (2022.01)
*H04L 41/08* (2022.01)

(52) U.S. Cl.
CPC ........ *H04L 41/085* (2013.01); *H04L 41/0876* (2013.01); *H04L 43/0817* (2013.01); *H04L 43/0876* (2013.01); *H04L 43/16* (2013.01)

(58) Field of Classification Search
CPC ............. G06F 9/45533; G06F 9/45558; G06F 9/5077; G06F 9/5083; H04L 41/00; H04L 41/02; H04L 41/0213; H04L 41/0681; H04L 41/085; H04L 41/0866; H04L 41/0893; H04L 43/00; H04L 43/0817; H04L 43/16; H04L 43/0876; H04L 43/14; H04L 41/0876
USPC ......................................................... 709/224
See application file for complete search history.

(56) References Cited

U.S. PATENT DOCUMENTS

| | | | |
|---|---|---|---|
| 6,493,316 B1 | 12/2002 | Chapman et al. | |
| 6,678,835 B1 | 1/2004 | Shah et al. | |
| 6,741,563 B2 | 5/2004 | Packer | |
| 6,754,228 B1 | 6/2004 | Ludwig | |
| 6,968,291 B1* | 11/2005 | Desai .................. G06F 11/3006 370/254 | |
| 7,032,022 B1 | 4/2006 | Shanumgam et al. | |
| 7,389,462 B1 | 6/2008 | Wang et al. | |
| 7,433,304 B1 | 10/2008 | Galloway et al. | |
| 7,802,234 B2 | 9/2010 | Sarukkai et al. | |
| 8,102,881 B1 | 1/2012 | Vincent | |
| 8,332,688 B1 | 12/2012 | Tompkins | |
| 8,332,953 B2 | 12/2012 | Lemieux et al. | |
| 8,527,982 B1 | 9/2013 | Sapuntzakis et al. | |
| 8,601,471 B2 | 12/2013 | Beaty et al. | |
| 8,738,972 B1* | 5/2014 | Bakman .............. G06F 11/3433 714/47.2 | |
| 9,239,727 B1* | 1/2016 | Panchapakesan .......................... G06Q 10/06315 | |
| 9,258,313 B1 | 2/2016 | Knappe et al. | |
| 9,275,172 B2 | 3/2016 | Ostermeyer et al. | |
| 9,319,286 B2 | 4/2016 | Panuganty | |
| 9,385,959 B2 | 7/2016 | Kompella et al. | |
| 9,465,734 B1 | 10/2016 | Myrick et al. | |
| 9,501,309 B2 | 11/2016 | Doherty et al. | |
| 9,600,307 B1 | 3/2017 | Pulkayath et al. | |
| 9,641,435 B1 | 5/2017 | Sivaramakrishnan | |
| 9,817,695 B2 | 11/2017 | Clark | |
| 9,830,190 B1 | 11/2017 | Pfleger, Jr. | |
| 9,900,262 B2 | 2/2018 | Testa et al. | |
| 9,906,454 B2 | 2/2018 | Prakash et al. | |
| 9,929,962 B2 | 3/2018 | Prakash et al. | |
| 9,940,111 B2 | 4/2018 | Labocki et al. | |
| 10,044,723 B1 | 8/2018 | Fischer et al. | |
| 10,061,657 B1 | 8/2018 | Chopra et al. | |
| 10,116,574 B2 | 10/2018 | Kompella et al. | |
| 10,191,778 B1 | 1/2019 | Fang et al. | |
| 10,284,627 B2 | 5/2019 | Lang et al. | |
| 10,291,472 B2 | 5/2019 | Banka | |
| 10,355,997 B2 | 7/2019 | Kompella et al. | |
| 10,841,181 B2 | 11/2020 | Cote et al. | |
| 2002/0031088 A1 | 3/2002 | Packer | |
| 2004/0054791 A1 | 3/2004 | Chakraborty et al. | |
| 2004/0073596 A1 | 4/2004 | Kloninger et al. | |
| 2004/0088322 A1* | 5/2004 | Elder ....................... G06F 16/38 | |
| 2004/0088412 A1 | 5/2004 | John et al. | |
| 2004/0088606 A1* | 5/2004 | Robison .............. G06F 11/3409 714/47.2 | |
| 2005/0058131 A1 | 3/2005 | Samuels et al. | |
| 2005/0091657 A1 | 4/2005 | Priem | |
| 2005/0132032 A1 | 6/2005 | Bertrand | |
| 2005/0228878 A1* | 10/2005 | Anstey .................... H04L 43/16 709/224 | |
| 2006/0101144 A1 | 5/2006 | Wiryaman et al. | |
| 2006/0200821 A1 | 9/2006 | Cherkasova et al. | |
| 2006/0259733 A1 | 11/2006 | Yamakazi et al. | |
| 2006/0271680 A1 | 11/2006 | Shalev et al. | |
| 2006/0294238 A1 | 12/2006 | Naik et al. | |
| 2007/0014246 A1 | 1/2007 | Aloni et al. | |
| 2007/0024898 A1 | 2/2007 | Uemura et al. | |
| 2007/0106769 A1 | 5/2007 | Liu | |
| 2007/0248017 A1 | 10/2007 | Hinata | |
| 2007/0266136 A1 | 11/2007 | Esfahany et al. | |
| 2007/0288224 A1 | 12/2007 | Sundarrajan et al. | |
| 2008/0098332 A1* | 4/2008 | LaFrance-Linden ....................... H04L 41/0893 715/846 | |
| 2008/0140820 A1 | 6/2008 | Snyder et al. | |
| 2008/0222633 A1 | 9/2008 | Kami | |
| 2008/0250415 A1 | 10/2008 | Illikkal et al. | |
| 2008/0253325 A1 | 10/2008 | Park et al. | |
| 2008/0270199 A1 | 10/2008 | Chess et al. | |
| 2008/0320147 A1 | 12/2008 | Delima et al. | |
| 2009/0028061 A1 | 1/2009 | Zaencker | |
| 2009/0172315 A1 | 7/2009 | Iyer et al. | |
| 2009/0183173 A1 | 7/2009 | Becker et al. | |
| 2010/0011270 A1 | 1/2010 | Yamamoto et al. | |
| 2010/0037291 A1 | 2/2010 | Tarkhanyan et al. | |
| 2010/0095300 A1 | 4/2010 | West et al. | |
| 2010/0125477 A1 | 5/2010 | Mousseau et al. | |
| 2011/0072486 A1 | 3/2011 | Hadar et al. | |
| 2011/0128853 A1 | 6/2011 | Nishimura | |
| 2011/0149737 A1 | 6/2011 | Muthiah et al. | |
| 2011/0154131 A1* | 6/2011 | Roney ................ G06F 11/0754 714/49 | |
| 2011/0219447 A1 | 9/2011 | Horovitz et al. | |
| 2011/0231857 A1 | 9/2011 | Zaroo et al. | |
| 2011/0276699 A1 | 11/2011 | Pedersen | |
| 2012/0002669 A1 | 1/2012 | Dietterle et al. | |
| 2012/0054330 A1 | 3/2012 | Loach | |
| 2012/0054763 A1 | 3/2012 | Srinivasan et al. | |
| 2012/0096167 A1 | 4/2012 | Free et al. | |
| 2012/0096320 A1* | 4/2012 | Caffrey ............... G06F 11/0709 714/57 | |
| 2012/0131225 A1 | 5/2012 | Chiueh et al. | |
| 2012/0151061 A1 | 6/2012 | Bartfai-Walcott et al. | |
| 2012/0166517 A1 | 6/2012 | Lee et al. | |
| 2012/0210318 A1 | 8/2012 | Sanghvi et al. | |
| 2012/0272241 A1 | 10/2012 | Nonaka et al. | |
| 2012/0303923 A1 | 11/2012 | Behera et al. | |
| 2012/0311098 A1 | 12/2012 | Inamdar et al. | |
| 2012/0311138 A1 | 12/2012 | Inamdar et al. | |
| 2012/0324445 A1 | 12/2012 | Dow et al. | |
| 2012/0331127 A1* | 12/2012 | Wang ................... G06F 9/4862 709/224 | |
| 2013/0003553 A1 | 1/2013 | Samuels | |
| 2013/0042003 A1 | 2/2013 | Franco et al. | |
| 2013/0044629 A1 | 2/2013 | Biswas et al. | |
| 2013/0066939 A1 | 3/2013 | Shao | |
| 2013/0163428 A1 | 6/2013 | Lee et al. | |
| 2013/0205037 A1 | 8/2013 | Biswas | |
| 2013/0218547 A1 | 8/2013 | Ostermeyer et al. | |

(56) References Cited

U.S. PATENT DOCUMENTS

| | | |
|---|---|---|
| 2013/0263209 A1 | 10/2013 | Panuganty |
| 2013/0297802 A1 | 11/2013 | Laribi |
| 2013/0332927 A1 | 12/2013 | Tang et al. |
| 2013/0346973 A1 | 12/2013 | Oda et al. |
| 2014/0007094 A1 | 1/2014 | Jamjoom |
| 2014/0007097 A1 | 1/2014 | Chin et al. |
| 2014/0019807 A1 | 1/2014 | Harrison et al. |
| 2014/0025890 A1 | 1/2014 | Bert et al. |
| 2014/0026133 A1 | 1/2014 | Parker |
| 2014/0067779 A1 | 3/2014 | Ojha et al. |
| 2014/0075013 A1 | 3/2014 | Agrawal et al. |
| 2014/0092744 A1 | 4/2014 | Sundar et al. |
| 2014/0123133 A1 | 5/2014 | Luxenberg |
| 2014/0130039 A1 | 5/2014 | Chaplik et al. |
| 2014/0165063 A1 | 6/2014 | Shiva et al. |
| 2014/0189684 A1 | 7/2014 | Zaslavsky et al. |
| 2014/0192639 A1 | 7/2014 | Smirnov |
| 2014/0196038 A1 | 7/2014 | Kottomtharayil et al. |
| 2014/0241159 A1 | 8/2014 | Kakadia et al. |
| 2014/0258535 A1 | 9/2014 | Zhang |
| 2014/0304320 A1 | 10/2014 | Faneja et al. |
| 2014/0313904 A1 | 10/2014 | Brunet et al. |
| 2014/0334301 A1 | 11/2014 | Billaud et al. |
| 2014/0372513 A1 | 12/2014 | Jones |
| 2015/0067404 A1 | 3/2015 | Eilam et al. |
| 2015/0085665 A1 | 3/2015 | Kompella et al. |
| 2015/0089500 A1 | 3/2015 | Kompella et al. |
| 2015/0127912 A1 | 5/2015 | Solihin et al. |
| 2015/0169306 A1 | 6/2015 | Labocki et al. |
| 2015/0193245 A1 | 7/2015 | Cropper |
| 2015/0195164 A1 | 7/2015 | Klein |
| 2015/0195182 A1 | 7/2015 | Mathur et al. |
| 2015/0215214 A1 | 7/2015 | Ng et al. |
| 2015/0215946 A1 | 7/2015 | Raleigh et al. |
| 2015/0234670 A1 | 8/2015 | Shimogawa |
| 2015/0234674 A1 | 8/2015 | Zhong |
| 2015/0242245 A1* | 8/2015 | Brown ............... G06F 12/1072 718/105 |
| 2015/0277957 A1 | 10/2015 | Shigeta |
| 2015/0378743 A1 | 12/2015 | Zellermayer et al. |
| 2015/0381711 A1 | 12/2015 | Singh et al. |
| 2016/0055025 A1 | 2/2016 | Jul et al. |
| 2016/0080206 A1 | 3/2016 | Prakash et al. |
| 2016/0080207 A1 | 3/2016 | Prakash et al. |
| 2016/0088326 A1 | 3/2016 | Solomon et al. |
| 2016/0092257 A1 | 3/2016 | Wang et al. |
| 2016/0103669 A1 | 4/2016 | Gamage et al. |
| 2016/0127184 A1 | 5/2016 | Bursell |
| 2016/0139948 A1 | 5/2016 | Beveridge et al. |
| 2016/0154665 A1 | 6/2016 | Iikura et al. |
| 2016/0182345 A1 | 6/2016 | Herdrich et al. |
| 2016/0239331 A1 | 8/2016 | Tamura et al. |
| 2016/0246647 A1 | 8/2016 | Harris et al. |
| 2016/0259941 A1 | 9/2016 | Vasudevan et al. |
| 2016/0269302 A1 | 9/2016 | Kompella et al. |
| 2016/0277249 A1 | 9/2016 | Singh et al. |
| 2016/0344604 A1 | 11/2016 | Raleigh et al. |
| 2016/0359897 A1 | 12/2016 | Yadav et al. |
| 2016/0366233 A1 | 12/2016 | Le et al. |
| 2016/0371127 A1 | 12/2016 | Antony et al. |
| 2016/0378519 A1 | 12/2016 | Gaurav et al. |
| 2017/0033995 A1 | 2/2017 | Banka et al. |
| 2017/0093918 A1 | 3/2017 | Banerjee et al. |
| 2017/0094377 A1 | 3/2017 | Herdrich et al. |
| 2017/0094509 A1 | 3/2017 | Mistry et al. |
| 2017/0116014 A1 | 4/2017 | Yang et al. |
| 2017/0149630 A1 | 5/2017 | Feller et al. |
| 2017/0160744 A1 | 6/2017 | Chia et al. |
| 2017/0171245 A1 | 6/2017 | Lee et al. |
| 2017/0199752 A1 | 7/2017 | Cao et al. |
| 2017/0235677 A1 | 8/2017 | Sakaniwa et al. |
| 2017/0262375 A1 | 9/2017 | Jenne et al. |
| 2017/0279735 A1 | 9/2017 | Yousaf |
| 2017/0315836 A1 | 11/2017 | Langer et al. |
| 2018/0088997 A1 | 3/2018 | Min |
| 2018/0097728 A1 | 4/2018 | Bodi Reddy et al. |
| 2018/0123919 A1 | 5/2018 | Naous et al. |
| 2018/0139100 A1 | 5/2018 | Pal et al. |
| 2018/0157511 A1 | 6/2018 | Krishnan et al. |
| 2018/0173549 A1 | 6/2018 | Browne et al. |
| 2018/0176088 A1 | 6/2018 | Ellappan et al. |
| 2018/0285166 A1 | 10/2018 | Roy et al. |
| 2018/0287902 A1 | 10/2018 | Chitalia et al. |
| 2018/0300182 A1 | 10/2018 | Hwang et al. |
| 2020/0195509 A1 | 6/2020 | Singh et al. |
| 2021/0099368 A1 | 4/2021 | Chitalia et al. |
| 2022/0103431 A1 | 3/2022 | Singh et al. |
| 2022/0124013 A1 | 4/2022 | Chitalia et al. |

FOREIGN PATENT DOCUMENTS

| | | | |
|---|---|---|---|
| CN | 102082703 A | 6/2011 | |
| CN | 102254021 A | 11/2011 | |
| CN | 102255935 A | 11/2011 | |
| CN | 102664786 A | 9/2012 | |
| CN | 102981931 A | 3/2013 | |
| CN | 103210618 A | 7/2013 | |
| CN | 103281366 A | 9/2013 | |
| CN | 103401917 | 11/2013 | |
| CN | 103744771 A | 4/2014 | |
| CN | 106088254 A | 6/2014 | |
| CN | 104360924 A | 2/2015 | |
| CN | 104378262 A | 2/2015 | |
| CN | 104468587 A | 3/2015 | |
| CN | 104981783 A | 10/2015 | |
| CN | 105897946 A | 8/2016 | |
| EP | 0831617 A2 | 3/1998 | |
| EP | 1331564 A1 | 7/2003 | |
| EP | 2687991 A2 | 1/2014 | |
| EP | 2728812 A1 * | 5/2014 | ............ H04L 47/21 |
| WO | 2009089051 A2 | 7/2009 | |
| WO | WO-2013057089 A1 * | 4/2013 | ............ H04W 76/00 |
| WO | 2013101843 A2 | 7/2013 | |
| WO | 2013184846 A1 | 12/2013 | |
| WO | 2015048326 A1 | 4/2015 | |

OTHER PUBLICATIONS

Visualizing metrics on areas of interest in software architecture diagrams Heorhiy Byelas;Alexandru Telea 2009 IEEE Pacific Visualization Symposium Year: 2009 | Conference Paper | Publisher: IEEE (Year: 2009).*

A quantitative security metric model for security controls: Secure virtual machine migration protocol as target of assessment Tayyaba Zeb;Muhammad Yousaf;Humaira Afzal;Muhammad Rafiq Mufti China Communications Year: 2018 | vol. 15, Issue: 8 | Magazine Article | Publisher: IEEE (Year: 2018).*

Design of a comprehensive virtual machine monitoring system Jiangyong Shi; Yuexiang Yang; Jie He; Chuan Tang; Qiang Li 2014 IEEE 3rd International Conference on Cloud Computing and Intelligence Systems Year: 2014 | Conference Paper | Publisher: IEEE (Year: 2014).*

"AppFormix Metrics," AppFormix, Aug. 6, 2017, 6 pp.

"Creating Projects in OpenStack for Configuring Tenants in Contrail," Juniper Networks, Inc., Contrail, Jan. 16, 2015, 2 pp.

"Host Aggregates," OpenStack Docs, accessed from https://docs.openstack.org/nova/latest/user/aggregates.html, accessed on Feb. 14, 2018, 3 pp.

"Improving Real-Time Performance by Utilizing Cache Allocation Technology—Enhancing Performance via Allocation of the Processor's Cache," White Paper, Intel® Corporation, Apr. 2015, 16 pp.

"OpenStack Docs: Manage projects, users, and roles," Openstack Keystone service version 12.0.1.dev19, Jul. 26, 2018, 7 pp.

"Transmission Control Protocol," DARPA Internet Program Protocol Specification, Sep. 1981, RFC 793, 90 pp.

Gamage et al., "Opportunistic Flooding to Improve TCP Transmit Performance in Virtualized Clouds," Proceedings of the 2nd ACM Symposim on Cloud Computing, Oct. 27-28, 2011, 14 pp.

Gamage et al., "Protocol Responsibility Offloading to Improve TCP Throughput in Virtualized Environments," ACM Transactions on Computer Systems, 31(3) Article 7, Aug. 2013, pp. 7:1-7:34.

(56) References Cited

OTHER PUBLICATIONS

Hopps, "Analysis of an Equal-Cost Multi-Path Algorithm," RFC 2992, Network Working Group, Nov. 2000, 8 pp.
Kangarlou et al., "vSnoop: Improving TCP Throughput in Virtualized Environments via Acknowledgement Offload," International Conference for High Performance Computing, Networking, Storage and Analysis (SC), Nov. 2010, 11 pp.
Ramakrishnan et al., "The Addition of Explicit Congestion Notification (ECN) to IP," RFC 3168, Network Working Group, Sep. 2001, 63 pp.
Response to Written Opinion dated Jul. 17, 2017, from International Application No. PCT/US2016/042606, filed Sep. 15, 2017, 20 pp.
Roy, "AppFormix and Intel RDT Integration: Orchestrating Virtual Machines on OpenStack," AppFormix Blog, Apr. 1, 2016, 5 pp.
Roy, "CPU shares insufficient to meet application SLAs," APPFORMIX-TR-2016-1, Mar. 2016, 3 pp.
Roy, "Meet Your Noisy Neighbor, Container," AppFormix Blog, Mar. 31, 2016, 8 pp.
Singh, "AppFormix: Realize The Performance Of Your Cloud Infrastructure—Solution Brief," AppFormix, Intel® Corporation, Mar. 27, 2016, 7 pp.
Thierry et al., "Improved TCP Performance in Wireless IP Networks through Enhanced Opportunistic Scheduling Algorithms," IEEE Global Telecommunications Conference, vol. 5, Nov. 29, 2004, pp. 2744-2748.
U.S. Appl. No. 15/946,645, by Juniper Networks, Inc. (Inventors: Chitalia et al.), filed Apr. 5, 2018.
U.S. Appl. No. 62/487,254, by Juniper Networks, Inc. (Inventors: Roy et al.), filed Apr. 19, 2017.
Second Written Opinion of International Application No. PCT/US2016/042606, dated Jul. 17, 2017, 10 pp.
International Preliminary Report on Patentability from International Application No. PCT/US2016/042606, dated Nov. 16, 2017, 30 pp.
Extended Search Report from counterpart European Application No. 16831046.4, dated Dec. 19, 2018, 9 pp.
Response filed Jul. 4, 2019 to the Extended Search Report from counterpart European Application No. 16831046.4, dated Dec. 19, 2018, 14 pp.
Prosecution History from U.S. Appl. No. 14/811,957 dated Jun. 14, 2017 through Mar. 25, 2019, 150 pp.
Zhang et al., "Hypernetes: Bringing Security and Multi-tenancy to Kubernetes," from https://kubernetes.io/blog/2016/05/hypernetes-secu rityand-multi-tenancy-in-kubernetes/. May 24, 2016, 9 pp.
Examination Report from counterpart European Application No. 16831046.4, dated Oct. 18, 2019, 7 pp.
Response to Examination Report dated May 12, 2020 from counterpart European Application No. 16831046.4, filed Sep. 11, 2020, 8 pp.
Nguyen, "Intel's Cache Monitoring Technology Software-Visible Interfaces," Intel, last retrieved Sep. 27, 2020 from: https:1/software.intel.com/content/www/us/en/develop/blogs/intel-s-cache-monitoring-technology-software-visible-interfaces.html, Dec. 12, 2014, 8 pp.
Tusa et al., "AAA in a Cloud-Based Virtual DIME Network Architecture (DNA)," 2011 20th IEEE International Workshops on Enabling Technologies: Infrastructure for Collaborative Enterprises, Jun. 27-29, 2011, pp. 110-115.
Response to Examination Report dated Oct. 18, 2019 from counterpart European Application No. 16831046.4, filed Feb. 18, 2020,12 pp.
Examination Report from counterpart European Application No. 16831046.4, dated May 12, 2020, 7 pp.
Examination Report from counterpart European Application No. 16831046.4, dated Nov. 5, 2020, 8 pp.
First Office Action and Search Report, and translation thereof, from counterpart Chinese Application No. 201680038168.9, dated Jan. 6, 2021, 20 pp.
Response to Examination Report dated Nov. 5, 2020 from counterpart European Application No. 16831046.4, filed Mar. 12, 2021, 21 pp.
Examination Report from counterpart European Application No. 16831046.4, dated Jun. 8, 2021, 8 pp.
Second Office Action and Search Report, and translation thereof, from counterpart Chinese Application No. 201680038168.9, dated Aug. 3, 2021, 18 pp.
Decision of Rejection, and translation thereof, from counterpart Chinese Application No. 201680038168.9 dated Apr. 14, 2022, 28 pp.
U.S. Appl. No. 17/657,595, filed Mar. 31, 2022, naming inventors Chitalia et al.
Third Office Action, and translation thereof, from counterpart Chinese Application No. 201680038168.9 dated Dec. 20, 2021, 29 pp.
Intel, "Realize The Performance of You Cloud Infrastructure", AppFormix, Mar. 27, 2016, 7 pp.

* cited by examiner

ASSESSMENT OF OPERATIONAL STATES OF A COMPUTING ENVIRONMENT

CROSS REFERENCE

This application is a continuation application of and claims priority to U.S. application Ser. No. 14/811,957, filed on Jul. 29, 2015, which is hereby incorporated by reference herein in its entirety.

BACKGROUND

On a host device, performance metrics are generally available and can characterize an operational state of the host device. Monitoring temperature and changes thereof can permit monitoring operational states of hardware. In addition, monitoring of computing resources available in the host device can permit or otherwise facilitate monitoring usage of such resources (CPU, memory, disk space, and the like). Other resources also can be monitored, such as a rate at which input/output (I/O) operations are occurring (e.g., disk input/output (I/O), network I/O, and so forth) in the host device. As resources available to host devices increase and demand for those resources grows, efficient characterization of an operational state of a host device becomes more challenging.

BRIEF DESCRIPTION OF THE DRAWINGS

The accompanying drawings are an integral part of the disclosure and are incorporated in and constitute a part of this specification. The drawings illustrate example, nonlimiting embodiments and, in conjunction with the description and claims set forth herein, serve to explain at least some of the principles of this disclosure.

SUMMARY

Figure 1:
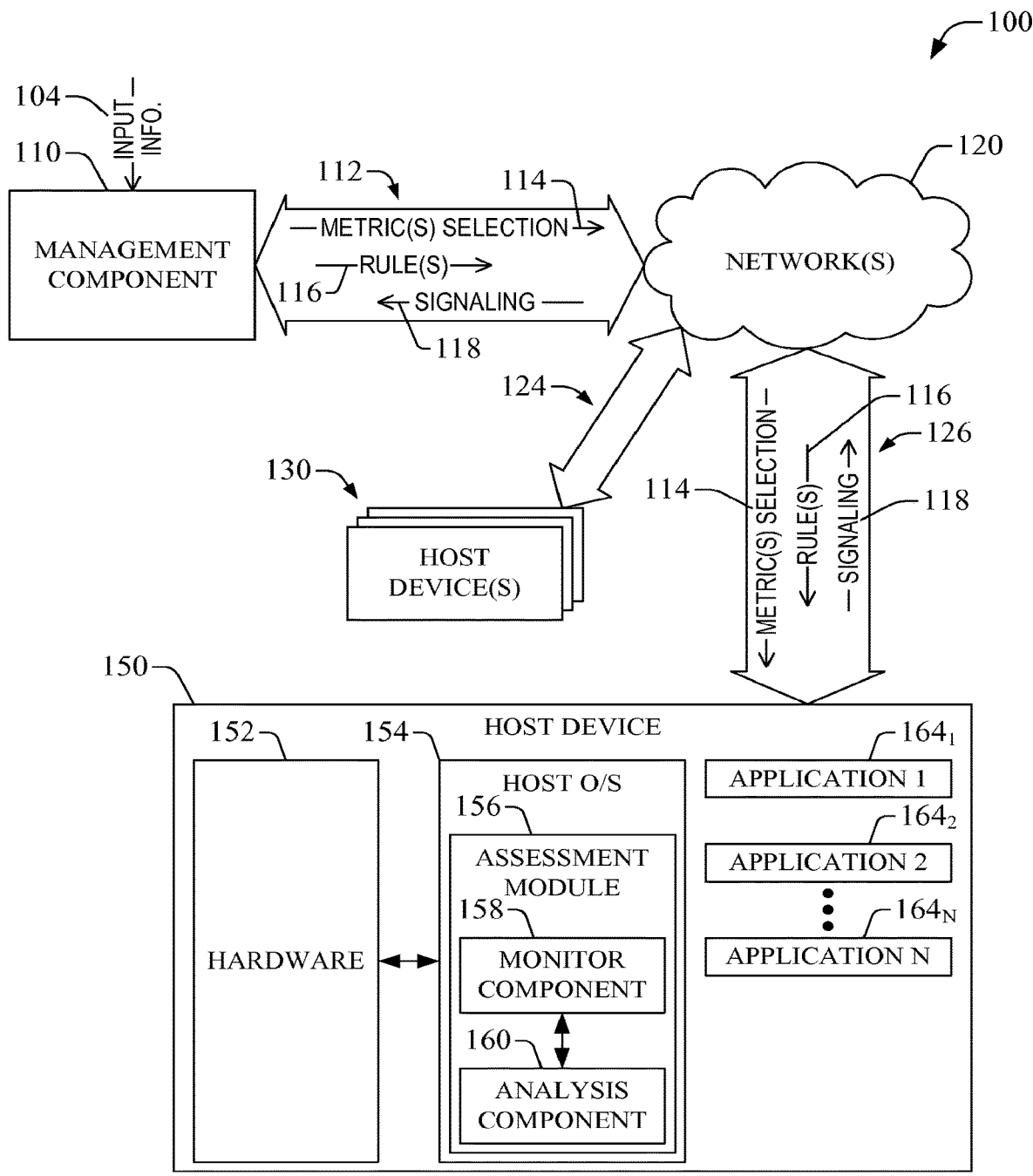
FIG. 1 presents an example of an operational environment for assessment of operational state of a computing component in accordance with one or more embodiments of the disclosure.

This disclosure describes techniques that permit or otherwise facilitate assessment of operational state of a computing component in a computing environment. More specifically, yet not exclusively, the disclosure provides an assessment environment that permits or otherwise facilitates generation of real-time or nearly real-time events and/or alarms based at least on operational state of a host device.

In one example, this disclosure describes a method comprising collecting, by a server device that is executing within a server device cluster, metric information indicative of an operational state of the server device, wherein the metric information is associated with a plurality of virtual computing instances executing on the server device, and wherein the plurality of virtual computing instances includes a first virtual computing instance and a second virtual computing instance; analyzing, by the server device and based on the metric information, whether a first condition associated with the first virtual computing instance is satisfied; analyzing, by the server device and based on the metric information, whether a second condition associated with the second virtual computing instance is satisfied; determining, by the server device, that both the first condition and the second condition are satisfied; and updating control information characterizing the operational state of the server device executing within the server device cluster.

In another example, this disclosure describes a system comprising a storage system; and processing circuitry in a server device that is executing within a server device cluster, wherein the processing circuitry has access to the storage system and is configured to cause the server device to: collect a first set of metric information associated with a first virtual computing instance executing on a server device that is executing within a server device cluster, collect a second set of metric information associated with a second virtual computing instance executing on the server device, analyze, based on the first set of metric information, whether a first condition associated with the first virtual computing instance is satisfied, analyze, based on the second set of metric information, whether a second condition associated with the second virtual computing instance is satisfied, determine that both the first condition and the second condition are satisfied, and update control information characterizing an operational state of the server device executing within the server device cluster.

In another example, this disclosure describes a computer-readable storage medium comprises instructions that, when executed, configure processing circuitry of a computing system to collecting a first set of metric information associated with a first virtual computing instance executing on a server device that is executing within a server device cluster; collecting a second set of metric information associated with a second virtual computing instance executing on the server device, analyzing, based on the first set of metric information, whether a first condition associated with the first virtual computing instance is satisfied; analyzing, based on the second set of metric information, whether a second condition associated with the second virtual computing instance is satisfied; determining that both the first condition and the second condition are satisfied; and updating control information characterizing an operational state of the server device executing within the server device cluster.

DETAILED DESCRIPTION

The disclosure recognizes and addresses, in at least some embodiments, the lack of efficient monitoring of operational conditions of a computing device in a computing environment. In conventional approaches, a process on a host device, for example, obtains information indicative of performance metrics and then sends the information to an analysis platform device remotely located from the host device. The analysis platform device can receive the information and can check for a defined condition in order to characterize an operation state of the host device. Such conventional approaches can introduce latency and can be limited with respect to richness of details of the monitored performance metrics. Embodiments of the disclosure include systems, apparatuses, devices, and computer-accessible storage devices that, individually or in combination, can permit or otherwise facilitate assessment of operational state of a computing component in a computing environment. More specifically, yet not exclusively, the disclosure provides an assessment environment that permits or otherwise facilitates generation of real-time or nearly real-time events and/or alarms based at least on operational state of a host device. In some embodiments, an agent module executing in the host device can monitor some or all of the performance metrics that are available in the host device and can analyze the monitored information in order to generate operational information and/or intelligence associated with an operational state of the host device and/or a computing component associated therewith. The monitoring and analysis can be performed locally at the host device in real-time or nearly real-time. In an environment in which virtual machines (VMs) and/or containers share the host device, the agent module can monitor and analyze resource utilization attributed to each of the VMs and/or containers, thus providing a stream of real-time metrics of resource consumption according to computing component that consumes the resource. Analysis of the monitored information can be utilized to update first control information indicative of occurrence of an event and/or second control information indicative of presence or absence of an alarm condition. The control information can be sent to a remote device to update information and/or intelligence related to performance conditions of the host device.

As described in greater detail below, embodiments of the disclosure can permit or otherwise facilitate monitoring locally at a host device a diverse group of performance metrics associated with the host device. In addition, information generated from the monitoring can be analyzed locally at the host device in order to determine (at the host device) an operational state of a host device. In view of the localized nature of the monitoring and analysis of this disclosure, the assessment of operational conditions of the host device can be performed in real-time or nearly real-time. In addition, such an assessment can permit or otherwise facilitate detecting events and/or transitions between alarm conditions without the latency commonly present in conventional monitoring systems. The assessment in accordance with this disclosure can be based on rich, yet flexible, test condition that can be applied to information indicative of performance metrics. In certain implementations, the test condition can be applied to a defined computing component, e.g., a host device, an application executing in the host device, a virtual machine instantiated in the host device, or a container instantiated in the host device or in a virtual machine. Thus, embodiments of the disclosure can permit monitoring resource utilization attributed to each of the virtual machines or containers that shares resources of a host device. As such, a stream of real-time or nearly real-time metrics of resource consumption ordered by the computing component can be analyzed. Such specificity in the testing associated with assessment of operational states of a host device can permit or otherwise facilitate the detection of performance bottlenecks and/or determination of root-cause(s) of the bottleneck.

Implementation of aspects of this disclosure can provide, in at least certain embodiments, improvements over conventional technologies for monitoring operational conditions of a computing device (e.g., a host device, such as a server device) in a computing environment. In one example, assessment of an operational condition of the computing device is implemented locally at the computing device. Therefore, performance metrics associated with the assessment can be accessed at a higher frequency, which can permit or otherwise facilitate performing the assessment faster. Implementing the assessment locally avoids the transmission of information indicative of performance metrics associated with assessment to a remote computing device for analysis. As such, latency related to the transmission of such information can be mitigated or avoided entirely, which can result in substantial performance improvement in scenarios in which the number of performance metrics included in the assessment increases. In another example, the amount of information that is sent from the computing device can be significantly reduced in view that information indicative or otherwise representative of alarms and/or occurrence of an event is to be sent, as opposed to raw data obtained during the assessment of operational conditions. In yet another example, the time it takes to generate the alarm can be reduced in view of efficiency gains related to latency mitigation.

With reference to the drawings, FIG. 1 illustrates an example of an operational environment 100 for determination of a location of a mobile device in accordance with one or more embodiments of the disclosure. The illustrated operational environment 100 includes a management component 110 that can receive input information 104 indicative or otherwise representative of a selection of performance metrics to be analyzed at one or more host devices 130, 150. The input information 104 also can be indicative or otherwise representative of one or more rules associated with a test that can be utilized to perform or otherwise facilitate the analysis at a host device 130, 150. The test can be associated with the selection of performance metrics in that the test can be applied to at least one of the performance metrics. The input information 104 can be received from an end-user or from a computing device operationally coupled to the management component I/O. The management component 110 can centralized and can be operatively coupled (e.g., communicatively coupled, electrically coupled, and/or electromechanically coupled) to host devices 130, 150 via a network 120 and communication links 112, 124. More specifically, as illustrated, the management component 110 can be operationally coupled to one or more host devices 130 via communication links 112, at least one of network(s) 120, and communication links 124. In addition, the management component I/O can be operationally coupled to a host device 150 via the communication links 126, at least one of the network(s) 120, and communication links 126. Each of the communication links 112, 124, and 126 can permit the exchange of information (e.g., data, metadata, and/or signaling) between the management component 110 and a host device. In some embodiments, each of the communication links 112, 124, and 126 can include an upstream link (or uplink (UL)) and a downstream link (or downlink (DL)), and can be embodied in or can include wireless links (e.g., deep-space wireless links and/or terrestrial wireless links); wireline links (e.g., optic-fiber lines, coaxial cables, and/or twisted-pair lines); routers; switches; server devices; aggregator devices; bus architectures; a combination of the foregoing; or the like.

In some embodiments, the host device(s) 130 and the host device 150 can embody or can constitute a server farm. For instance, the host device(s) 130 and the host device 150 can embody a cluster of 10 server devices separated in two groups. One or more of the host device 150 or at least one of the host device(s) 130 can be configured to execute an application, a virtual machine, and/or a containerized application (or a container). As such, the performance metrics that can be conveyed by the input information 104 include one or more of the following: (a) performance metrics associated with computing component (e.g., a host device, an instance of a virtual machine executing in the host device, an instance of a container executing in the host device, or the like), such as one or more of hard disk drive (HDD) space usage (expressed in percentage or in absolute magnitude); input/output (I/O) rate; memory space usage (expressed as a percentage or in absolute magnitude); network incoming bandwidth available, network outgoing bandwidth available, number of incoming packets, number of outgoing packets, packet size distribution, number of incoming packets lost, number of outgoing packets lost; round trip time (RTT) of all flows for a Instance; flow duration for a Instance; number of TCP Sessions Requested (SYN); number of TCP Sessions Confirmed (SYN-ACK); number of TCP Sessions Rejected (RST); central processing unit (CPU) usage (expressed as a percentage or as usage time interval); or I/O wait time, which includes the time the CPU is waiting on I/O requests, (b) performance metrics associated with execution of an application at a host device, such as one or more of number of packets reordered; number of packets dropped or lost; response-time (e.g., time taken by the application to respond to a request); request rate (e.g., number of requests that the application receives); response rate (e.g., number of responses performed or otherwise facilitated by the application); latency (e.g., RTT of some or all flows or threads for the application); flow size (e.g., total number of bytes transferred); flow duration for the application (e.g., total time of a flow, or the like.

In addition or in other embodiments, the management component 110 can be embodied in or can constitute a management console or another type of computing device configured, for example, to execute software (e.g., an operating system (0/S), such as OpenStack) that can permit or otherwise facilitate the host device(s) 130 and the host device 150 to appear as a single logical server or another type of single logical component.

The management component 110 can permit defining a rule associated with a test. The rule can specify a scope of application of the rule. The scope can determine a group of computing components associated with host devices to which the rule or the associated test is to be applied. In one example, a computing component can be embodied in a host device, and the scope can determine a group of host devices to which the rule or the associated test is to be applied. For instance, the group of host devices can include one, two, or more of the host device 150 and the host device(s) 130. In another example, the computing device can be embodied in an instance of a virtual machine executing in a host device or an instance of a containerized application executing in a host device. Accordingly, the scope can determine a group of instances to which the rule or the associated test is to be applied. In yet another example, a computing component can be embodied in an application configured to execute in a host device and, thus, the scope can determine one or more applications to which the rule or the associated test is to be applied.

In addition or some embodiments, a rule associated with a test can specify a mode of assessment. In one example, the mode of assessment can be an event mode. In such a mode, output information indicative or otherwise representative of occurrence of an event can be generated in response to a defined outcome of application of the rule. In another example, the mode of assessment can be an alert mode in which output information indicative or otherwise representative of an active alarm condition or an inactive alarm condition can be generated in response to a defined outcome of application of the rule. In addition or in some implementations, in alarm mode, other output information can be generated in response to certain configurations of the assessment in accordance with aspects of this disclosure. For instance, the output information can be indicative or otherwise representative of a rule being disabled and/or enabled. Enablement or disablement (or deletion) of rules can be permitted or otherwise facilitated by the management component M.

Further or in other embodiments, a rule associated with a test can specify one or more matching criteria that can be utilized to determine if a computing component (e.g., a host device, a virtual machine, a container, or the like) under assessment satisfies at least one condition for (a) generating information indicative of occurrence of an event or (b) generating an alarm or information related thereto (e.g., alarm is in active state or an alarm is in an inactive state). A matching criterion can include a non-empty set of parameters and/or a non-empty set of operators. At least one operator of the non-empty set of operators can operate on at least one of the non-empty set of parameters. In addition or in one implementation, the at least one operator can operate on information indicative of a performance metric associated with the computing component. In some embodiments, the non-empty set of operators can include a function having a domain that can include one or more of the parameters and/or other parameter(s) (such as time).

A parameter included in a matching criterion can be a specific number (e.g., an integer or real number) indicative or otherwise representative of a threshold. Application of a rule associated with a test can include a comparison between the threshold and information indicative of a performance metric. For example, for CPU usage (one of several performance metrics contemplated in this disclosure), a rule can specify application of a relational operator (e.g., "greater than," "less than," "equal to") to the CPU usage and a numeric threshold (e.g., a defined percentage): If Host CPU usage>50% then raise Alert.

In certain scenarios, rather than being a predetermined parameter, a threshold can be a result of application of a function to information indicative of a performance metric. The function can be a scalar operator of a non-empty set of operators of a matching criterion. As such, in some implementations, the threshold can adopt a value that is an output of a defined algorithm. In one example, the function can represent the baseline standard deviation a (a real number) of N samples $\{x_1, x_2, x_3 \ldots x_N\}$ of input information indicative of a performance metric (e.g., CPU usage):

$$\sigma = \sqrt{\frac{1}{n}\sum_{i=1}^{N}(xi^{-u})^2}$$

Here, $x_1$ is a real number, i=1, 2 ... N, N is a natural number that defines a sampling interval) and µ is the mean of first N samples of the performance metrics (e.g., CPU usage). Therefore, the value of a that can be computed for a specific sampling of information conveying CPU usage can be utilized to define a threshold associated with a rule, for example: If Host CPU Usage >2σ then raise Alert.

It is noted that α is one example presented for the sake of illustration and other functions and/or operators can be utilized to define certain thresholds. For example, Min({•}) and Max({•}) of a sampling can be utilized. In addition or in the alternative, one or more of the moments, or a function thereof, of a sampling can be utilized as a function to determine a threshold value. For instance, the average (or first non-centered moment) of a sampling can be utilized as a threshold. It is noted that one of the parameters included in a rule can determine interval duration (ATs, which can be expressed in seconds or other unit of time) for collection (or sampling) of information indicative of a performance metric (e.g., CPU usage or other metrics).

Two types of rules can be configured: singleton rule and compound rule. A singleton rule tracks a single performance metric and compares the performance metric to a matching criterion. Control information associated with an event or an alarm can be generated in response to outcome of such a comparison. Multiple singleton rules can be defined based on different performance metrics for a given resource (e.g., a host device, an instance of virtual machine, an instance of a container, an instance of an application in execution). In addition, multiple singleton rules can be implemented concurrently or nearly concurrently for different instances. As an illustration, an Instance level alert can be generated based at least on the outcome of the application of the singleton rules. For instance, four single rules can be defined for two different instances (e.g., Instance 1 and Instance 2):
Singleton rule 1: If Instance 1 CPU Usage >50% then raise Alert;
Singleton rule 2: If Instance 1 Outgoing Bandwidth >500 Mbps then raise Alert;
Singleton rule 3: If Instance 2 disk_space_free <10% then raise Alert; and
Singleton rule 4: If Instance 2 CPU Usage>75% then raise Alert.
Singleton rule 5: If Host CPU Usage >50% then raise Alert
It is noted that rule 1 and rule 5 above are very different rules, as one rule relates to CPU usage within an instance and the other within a host device. It is further noted that the logical complement of a single rule also is a single rule, and can be utilized as a test condition in accordance with this disclosure.

A compound rule is a collection of two or more singleton rules. An order of the singleton rule(s) also defines the compound rule. Control information associated with an event or an alarm can be generated in response to outcomes of the two or more rules and, optionally, an order in which the outcomes occur. More specifically, example compound rules can be formed from the following two singleton rules: (A) Singleton Rule 1: if Host CPU Usage>50%; and (B) Singleton Rule 2: if Memory Usage >7 5% Raise Alert. A first compound rule can be the following:
Compound Rule 1=Singleton Rule 1 and then Singleton Rule 2. Stated equivalently, the Compound Rule 1 can be: if Host CPU usage>50% and after that Host Memory Usage>75% then raise Alert.

A second compound rule can be the following:
Compound Rule 2=Singleton Rule 2 and then Singleton Rule 1. Stated equivalently, the Compound Rule can be: if Host Memory Usage>75% and after that Host CPU usage>50% then raise Alert.

Concurrency of the rules also can provide an order in which the singleton rule can be applied nearly simultaneously and can be determined to be satisfied independently. Therefore, a third compound rule can be the following:
Compound Rule 3=Singleton Rule 1 and concurrently Singleton Rule 2. Stated equivalently, the Compound Rule 3 can be: if Host CPU Usage>50% and concurrently Host Memory usage>7 5% then raise Alert.

Other example compound rules can be formed using singleton rules for different instances of virtual machines configured to execute in a host device: (I) Singleton Rule 1: If Instance 1 Disk Usage >80% then raise Alert; and (II) Singleton Rule 2: If Instance 2 Disk Usage >80% then raise Alert. Example compound rules can be the following:
Compound Rule 1=Singleton Rule 1 and concurrently Singleton Rule 2 raise Alert. State equivalently, Compound Rule 1 is: If Instance 1 Disk Usage>80% and concurrently if Instance 2 Disk Usage >80% then raise Alert.
Compound Rule 2=When (Host MEMORY>90%) AND (Instance! CPU>50%) then raise Alert.
Compound Rule 3=When (Instance 1 CPU Usage >50%) AND (Instance 2 CPU Usage >50%) then raise Alert.
It is noted that such Compound Rule 2 correlates across two different metrics while measuring one on a host device and the second within an Instance (e.g., an instantiated VM or an instantiated container).

While for illustration purposes in the foregoing rule examples described herein a single operator is applied to information indicative of a performance metric and a predetermined threshold is relied upon as a matching criterion, the disclosure is not so limited. In some embodiments, parameters and functions associated with a rule can permit applying rich tests to information indicative of a performance metric. As an example, a rule can include an aggregation function that can generate information indicative of a performance metric (e.g., HDD usage) over a sampling period. The sample period can be a configurable parameter includes in the rule. In addition, the rule can include a relational operator (e.g., "greater than," "less than," "equal to," or the like) that can compare output of the aggregation function over the sampling period to a threshold (predetermined or computed from sampled information). Based on an outcome of the comparison the rule can generate a cumulative value indicative of a number of outcomes that satisfy a condition defined by the relational operator. In addition, the rule can stipulate that event is deemed to have occurred or that an alarm is to be generated in response to the determined cumulative value satisfying a defined criterion. Specifically, in one example, the test can be specified as follows:

If the aggregation function of the information sampling aggregated over the sampling period satisfies the relational operator with respect to the aggregated data and a threshold, then the sampling interval is marked as satisfying an exception condition. In addition, when it ascertained that the number of marked sampling intervals in a predetermined number of intervals is greater than or equal to a second threshold, then control information can be updated (e.g., generated or modified). For example, in event mode, updating the information can include generating control information indicative of an event having occurred. In another example, in alert mode, updating the information can include generating control information indicative of an alarm condition being active. It is noted that in alert mode, in case the alarm condition is active prior to ascertaining that the number of marked sampling intervals in the predetermined number of intervals is greater than or equal to the second threshold, an update of control information can be bypassed.

In addition, in event mode and in a scenario in which ascertaining that the number of marked sampling intervals in the predetermined number of intervals is less than the second threshold, updating the control information can include generating control information indicative of an event not having occurred. In view that the assessment described herein can be performed continually or nearly continually, updating the control information can include generating information that the event has ceased to occur. In alert mode, ascertaining that the number of marked sampling intervals in the predetermined number of intervals is less than the second threshold, updating the control information can include generating control information indicative of an alarm condition being inactive.

The test described herein can be defined by the input information 104. Therefore, in certain embodiments, the management component 110 can provide a user interface that can permit defining the assessment of a computing component. For example, the UI can permit receiving information indicative of a scope and mode of the assessment, and information indicative of a performance metric to be monitored. In addition, the UI can permit receiving information indicative of an aggregation function, a sampling duration, a comparison function (e.g., a relational operator), and a threshold. Further, the UI can permit receiving information indicative of parameters indicative of other matching criteria.

Example UI:
Apply to <SCOPE>
Generate <ALERT I EVENT> for <DataMetric> if <AggregationFunction> over a <IntervalDuration> duration interval is <ComparisonFunction> <Threshold> in <IntervalsWithException> of last <Interval Count> intervals.

In a specific example, the interface can permit receiving the foregoing information as follows:
Apply to ALL_HOSTS
Generate ALERT for CPU_PERCENTAGE if AVERAGE over aSs duration interval is GREATER_THANSO in 3 of last 4 intervals.

In some implementations, as described herein, a test in accordance with aspects of this disclosure can specify a group of computing components associated with one or more of the host device 150 or the host device(s) 130 on which the test is to be implemented. Such a subset can be referred to as the scope of the test. A computing component can be embodied in or can include a host device, an application executing in the host device, a virtual machine executing in the host device, or a containerized application (or container) executing in the host device. Implementation of the test at a host device associated with a computing component specified in the scope of the test can permit or otherwise facilitate assessment of performance state of the computing component. Therefore, it is noted that the scope of the test can mitigate or avoid operational overhead at the host device associated with the computing component by focusing the implementation of the test on a pertinent computing component.

Based at least on the scope of the test conveyed by the input information 104, the management component 110 can direct the host device 150 and/or at least one host device of the host device(s) 130 to implement the test conveyed by the input information 104. To that end, the management component 110 can send (e.g., push or otherwise transmit) first configuration information indicative or otherwise representative of the selection of performance metrics received in the input information 104. The first information can be herein referred to as metric(s) selection 114. In addition or in other embodiments, the management component I/O can send second configuration information indicative or otherwise representative of one or more rules associated with the test. The second configuration information can be herein referred to as rule(s) 116. The management component 110 can send the first configuration information and the second configuration information to a host device associated with a computing component specified by the scope of the test. As illustration, in a scenario in which the host device(s) 130 and the host device 150 embody a cluster of 10 server devices aggregated in two groups, a scope of a test can specific one of the two groups. Accordingly, the management component 110 can send the metric(s) selection 114 and/or the rule(s) 116 to the specified group in order for the test associated with the rule(s) 116 to be implemented in the desired computing components in the group. In addition or in another scenario, the scope of the test can specify a group of virtual machines executing or otherwise residing in a subset of the cluster. Thus, the management component 110 can send the metric(s) selection 114 and/or the rule(s) 116 to each server device in the subset of the cluster for implementation of the test. In some implementations, the metric(s) selection 114 and the rule(s) 116 can be sent according to a suitable communication protocol, such as transmission control protocol (TCP) or user datagram protocol (UDP).

As illustrated in the operational environment 100 shown in FIG. 1, the management component I/O can send the metric selection 114 and the rule(s) 116 to the host device 150. The host device 150 can include hardware 152 (e.g., processor(s), memory device(s), bus architecture(s), and so forth). The host device 150 also includes a host 0/S 154 and can be configured to execute a group of applications $164_1$, $164_2 \ldots 164_N$, with N a natural number equal to or greater than unity. It is noted that the host 0/S 154, application 1 $164_1$, application 2 $164_2 \ldots$ and application $164_N$ can be retained in one or more memory devices (not depicted) included in the host device 150. Such memory device(s) can be included in the hardware 152 or can be external thereto. The host 0/S 154 can permit or otherwise facilitate operation and/or administration (e.g., upgrades, software installation, any other configuration, or the like) of the host device 150. In some embodiments, the host 0/S 154 can include program modules that embody or constitute one or more operating systems, such as a Windows operating system, Unix, Linux, Symbian, Android, Chromium, or substantially any O/S suitable for operation of the host device 150.

The host O/S 154 can include an assessment module 156 configured to implement the performance analysis in accordance with aspects of this disclosure in response to execution by a processor (not depicted) of the hardware 152. To that end, the assessment module 156 can be embodied in or can include computer-executable instructions (e.g., computer-executable programming code) encoded or otherwise retained in a memory device containing the host O/S 154. In one implementation, the computer-executable instructions can be embodied in system calls and/or O/S commands (such as Linux commands or Unix commands). The computer executable instructions can be configured to be executed by at least the processor (not depicted) and, in response, the computer-executable instructions can be further configured to direct the host device 150 to monitor some or all performance metrics pertinent to the host device 150. In one implementation, in response to execution by at least the processor, the assessment module 156 can be configured to direct the host device 150 to monitor the performance metric(s) conveyed by the metric(s) selection 114. As such, the assessment module 156 can include a monitor component 158 that, in response to execution by at least the processor, can direct the host device 150 to receive the metric(s) selection 114 and to determine information indicative or otherwise representative of one or more of the performance metrics in the metric(s) selection 114. The information can be determined, for example, continually (or in real-time), nearly continually (or nearly in real-time), periodically, and/or according to a schedule. In addition or in the alternative, the information can be determined during a defined interval (which can be measured in seconds or other time unit). Upon or after the defined interval elapses, additional or new information can be determined during another period equal to the defined interval. It is noted that the performance metric(s) received in the metric(s) selection 112 can be performance metric(s) associated with execution of an application of applications $164_1$-$164_N$, such as number of packets reordered; number of packets dropped or lost; response-time (e.g., time taken by the application to respond to a request); request rate (e.g., number of requests that the application receives); response rate (e.g., number of responses performed or otherwise facilitated by the application); latency (e.g., RTT of some or all flows or threads for the application); flow size (e.g., total number of bytes transferred); flow duration for the application (e.g., total time of a flow, or the like. It is noted that the latency can be associated, in certain implementations, to exchange-to-exchange latency.

The assessment module 156 also can include an analysis component 160 that can apply the test conveyed by the rule(s) 116. The test can be applied to at least some of the information accessed or otherwise obtained by the monitor component 158. Therefore, in one embodiment, the analysis component 156 can be embodied in or can include computer executable instructions encoded or otherwise retained in a memory device containing the host O/S 154. In some implementations, the computer-executable instructions can be embodied in system calls and/or O/S commands (such as Linux commands or Unix commands). The computer-executable instructions can be configured to be executed by at least the processor that executes the assessment module 156 and, thus, the analysis component 160 itself is configured to be executed by at least the processor. In response to execution, the analysis component 160 can be configured to direct the host device 150 to apply the test to at least one of the performance metrics monitored via the monitor component 158. In addition, execution of the analysis component 160 can direct the host device 150 to determine whether an outcome of the applied test satisfies a matching criterion associated with the test.

Application of a test associated with the rule(s) 114, and analysis of the outcome of the applied test can constitute the assessment of an operational state of the host device 150. As described herein, the test can specify a mode of assessment, e.g., event mode or alarm mode. In response to execution, for the mode of assessment, the analysis component 160 can be configured to direct the host device 150 to update control information that can characterize an operational state of the host device. As such, in one embodiment, for event mode, the host device 150 can be directed to generate event information indicative of an occurrence of a specific condition defined by the matching criterion in the applied test. In addition or in another embodiment, for alarm mode, the host device can be directed to generate alarm information indicative or otherwise representative of an active alarm condition.

In addition or in other embodiments, in response to execution, the analysis component 160 can be configured to direct the host device 150 to send at least a portion of the control information to the management component 110 or other remote computing devices. Specifically, yet not exclusively, the host device 150 can be directed to send signaling 118 to the management component I/O, where the signaling 118 can include event information and/or alarm information. In some implementations, the signaling 118 can be sent according to a suitable communication protocol, such as TCP or UDP.

Figure 2:
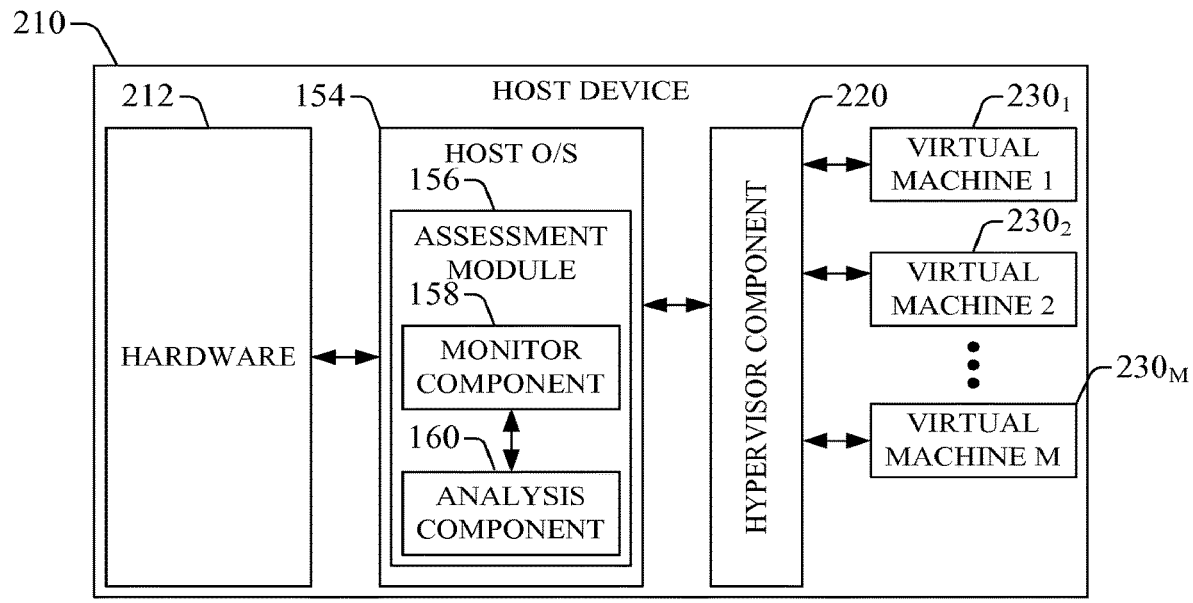
FIGS. 2-5 present examples of host devices in accordance with one or more embodiments of the disclosure.

FIG. 2 illustrates an example of a host device 210 in accordance with one or more embodiments described herein. Repetitive description of like elements included in other embodiments described herein is omitted for sake of brevity. The host device 210 can embody one of the host device(s) 130 in FIG. 1. As such, the host device 210 can receive metric(s) selection 114 and rule(s) 116. The host device 210 can be configured to provide a virtualized environment in which VMs can share the resources (e.g., O/S, CPUs, memory, disk space, incoming bandwidth, and/or outgoing bandwidth) of the host device 210. Hardware 212 can provide at least a portion of the shared resources. As illustrated, a group of M (a natural number) virtual machines can execute in the host device 210. Execution can be concurrent, nearly concurrent, or queued. A hypervisor component 220 can permit or otherwise facilitate configuration of a VM for execution in the host device 210 and execution of the VM in the host device 210. In one implementation, the rule(s) 116 can specify a scope of monitoring to include one or more of virtual machine 1 $230_1$, virtual machine 2 $230_2$ ... or virtual machine M $230_M$. The assessment module 156 can assess an operation state of such virtual machine(s) based at least on a test specified in the rule(s) 116 in accordance with aspects of the disclosure. The test can be performed on information indicative of performance metrics conveyed by the metric(s) selection 114, which can include information indicative or otherwise representative of performance metrics that can be specific to an instance in a virtualized environment. The host device 210 can send control information, which can be represented by signaling 118, based at least on an outcome of the test. As described herein, the control information can be associated with an event or an alarm condition.

Figure 3:
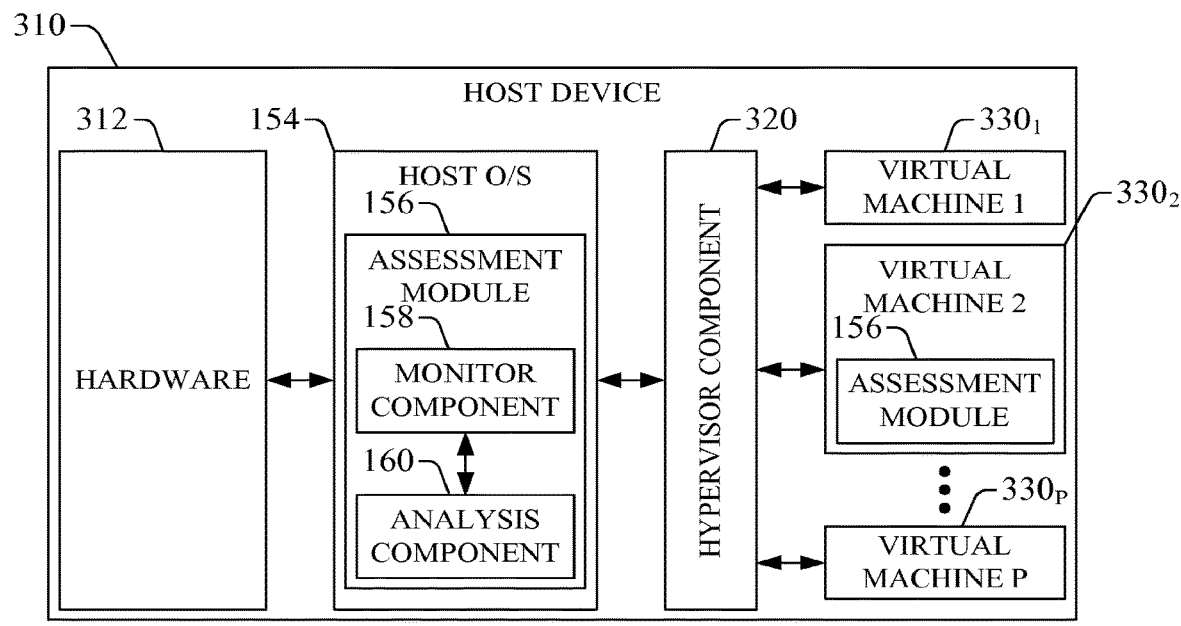

It is noted that a virtual machine can include an image of an O/S of the host device in which the virtual machine executes. As such, in some embodiments, a VM in a host device can include the assessment module 156. FIG. 3 presents an example host device 310 in which a VM machines includes the assessment module 156. The host device 310 can embody one of the host device(s) 130 in FIG. 1. As such, the host device 310 can receive metric(s) selection 114 and rule(s) 116. Specifically, the host device includes hardware 312 that can be shared among P (a natural number) virtual machines $330_1$-$330_P$. Similar to the host device 210 in FIG. 2, the host device 310 can include a hypervisor component 320 that can permit or otherwise facilitate configuration of a VM for execution in the host device 310 and execution of the VM in the host device 310. In one implementation, the rule(s) 116 can specify a scope of monitoring to include a single virtual machine having the assessment module 156, e.g., virtual machine $330_2$. Such an assessment module 156 can evaluate an operational state of such virtual machine(s) based at least on a test specified in the rule(s) 116 in accordance with aspects of the disclosure. The test can be performed on information indicative of performance metrics conveyed by the metric(s) selection 114, which can include information indicative or otherwise representative of performance metrics that can be specific to an instance in a virtualized environment. The host device 310 can send control information, which can be represented by signaling 118, based at least on an outcome of the test. As described herein, the control information can be associated with an event or an alarm condition.

Figure 4:
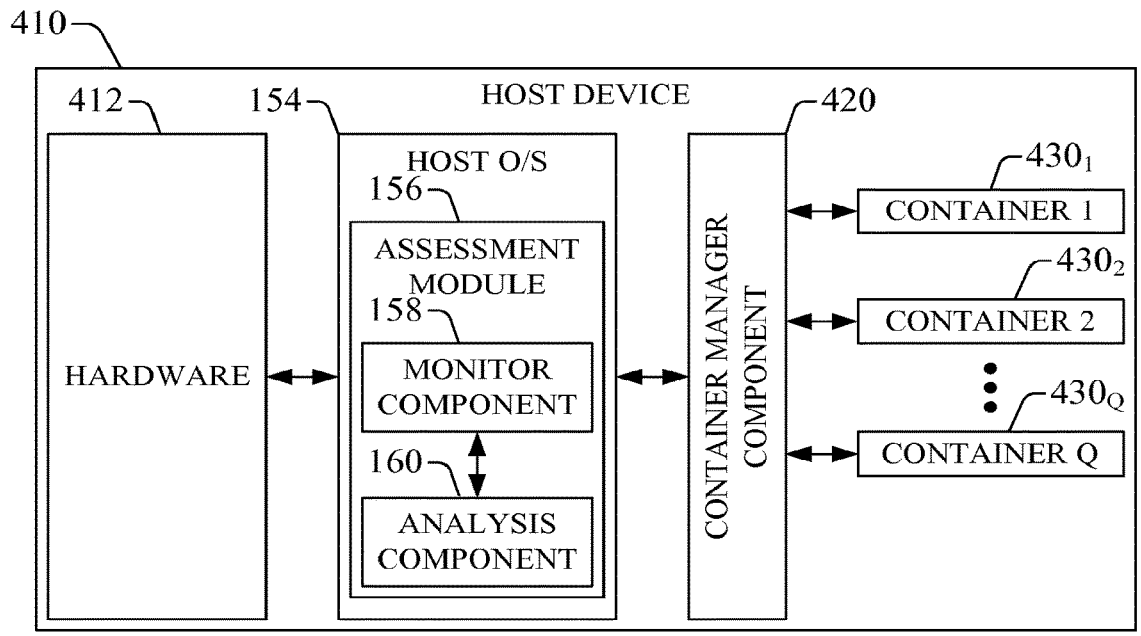

As described herein, the assessment of operational states of a computing component can be applied to containerized environments. FIG. 4 illustrates an example of a host device 410 in accordance with one or more embodiments described herein. Repetitive description of like elements included in other embodiments described herein is omitted for sake of brevity. The host device 410 can embody one of the host device(s) 130 in FIG. 1. Therefore, the host device 410 can receive the metric(s) selection 114 and rule(s) 116. The host device 410 can be configured to provide a containerized environment in which instances of one or more containers can share the resources of the host device 410. Hardware 412 can provide at least a portion of the shared resources. As illustrated, a group of Q (a natural number) containers $430_1$-$430_Q$ can instantiated in the host device 410. At least some of the containers $430_1$-$430_Q$ can execute concurrently or nearly concurrent. In addition or in other implementations, at least some of the containers can executed according to a queue maintained by a container manager component 420. The container manager component 420 also can permit or otherwise facilitate configuration of a container for execution in the host device 410 and also can manage allocation of host resources to a container and/or deallocation of some of such host resources from the container. In one implementation, the rule(s) 116 can specify a scope of monitoring to include one or more of container 1 $430_1$, container 2 $430_2$ . . . or container Q $230_Q$. The assessment module 156 can assess an operation state of such virtual machine(s) based at least on a test specified in the rule(s) 116 in accordance with aspects of the disclosure. The test can be performed on information indicative of performance metrics conveyed by the metric(s) selection 114, which can include information indicative or otherwise representative of performance metrics that can be specific to an instance in a virtualized environment. The host device 210 can send control information, which can be represented by signaling 118, based at least on an outcome of the test. As described herein, the control information can be associated with an event or an alarm condition.

Figure 5:
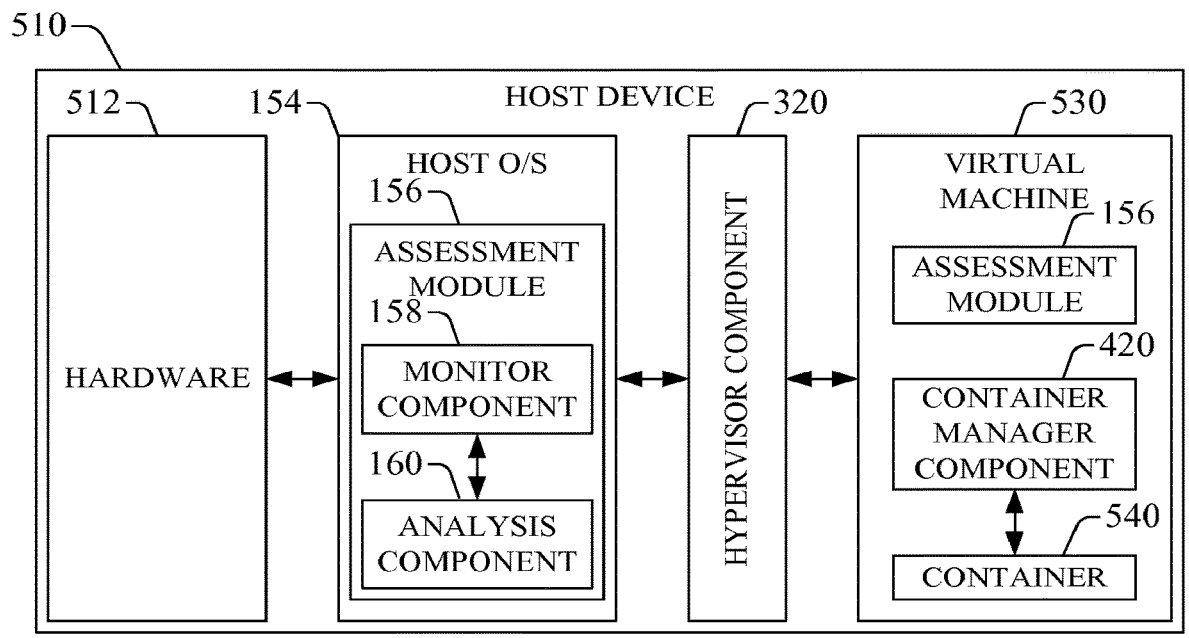

In addition or in other embodiments, a virtual machine including the assessment module 156 can rely on such an assessment module to assess an operational state of a container instantiated within the virtual machine. In such scenario, a scope of a rule(s) 116 can define the container as the computing component to be monitored. FIG. 5 illustrates an example of a host device 510 in accordance with one or more embodiments described herein. Repetitive description of like elements included in other embodiments described herein is omitted for sake of brevity. As illustrated, a virtual machine 530 can be instantiated within the host device 510 and can rely on the hardware 512 (e.g., CPUs, memory devices, network adapters, and so forth). The virtual machine 530 can include the assessment module 156 in an image of the host O/S 154 and can include the container manager component 420 that can instantiate a container 550. In execution, the assessment module 156 in the virtual machine 530 can evaluate an operational state of the container 550.

It is noted that while complexity may increase when the assessment module 156 is configured to execute within a virtual machine, the specificity of the monitoring can provide rich information that can permit analysis of transient contention for resources between a virtual machine and/or a container. Therefore, for some configurations of the assessment module 156, monitored performance metrics can permit or otherwise facilitate correlating loss in performance of a host device to failures in the host device, such as issues arising from inadequate sharing of resources of the host device. More specifically, assessment of the operational states of host devices such as host device 210, host device 310, host device 410, and host device 510 can permit or otherwise facilitate characterizing contention for resources amongst the consumer components (e.g., VMs, containers, and/or applications). In some scenarios, such a contention is a transient event and may not be detected unless a detailed metric analysis at fine time resolution (e.g., sub-second). Therefore, in one aspect, configuration of the assessment module 156 to monitor in real-time or nearly real-time performance metrics associated with a computing component can permit detection of transient events and/or other type of events that may be undetected in assessments performed in periods greater than a typical relaxation time (e.g., halflife) of the event.

Figure 6:
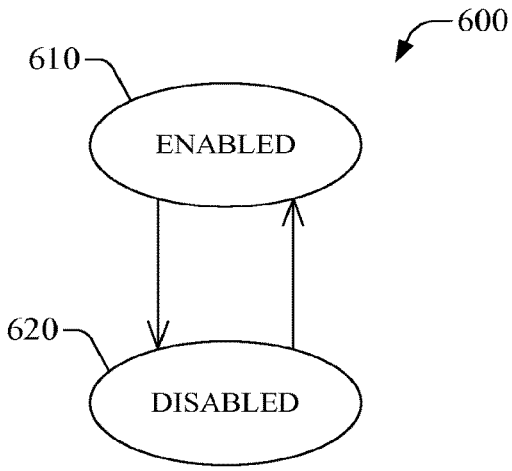
FIG. 6 presents an example of a state machine associated with event monitoring in accordance with one or more embodiments of the disclosure.

FIG. 6 illustrates an example of a state machine associated with assessment in event mode in accordance with one or more embodiments of the disclosure. When outcome of a test satisfies a matching criterion, the state machine shown in FIG. 6 can transition from an enabled state 610 representing that an event has occurred based on the matching criterion being satisfied. In one implementation, the assessment module 156 can generate event information indicative of the state 610 being enabled, which can represent that a defined state of the computing component (e.g., a host device, a virtual machine executing in a host device, or a container executing in a host device) is present in view of the matching criterion being satisfied. For instance, traffic congestion may be present at a host device in view of available outgoing bandwidth being below a defined threshold value. In addition, in response to an outcome of a test not satisfying a matching criterion and/or the test being deleted or explicitly disabled, e.g., rule(s) 116 is indicative of a test reset or test disabled, then the state machine shown in FIG. 6 can either transition from the state 610 to a state 620 representing an event disabled condition or the state machine can be configured to state 620.

Figure 7:
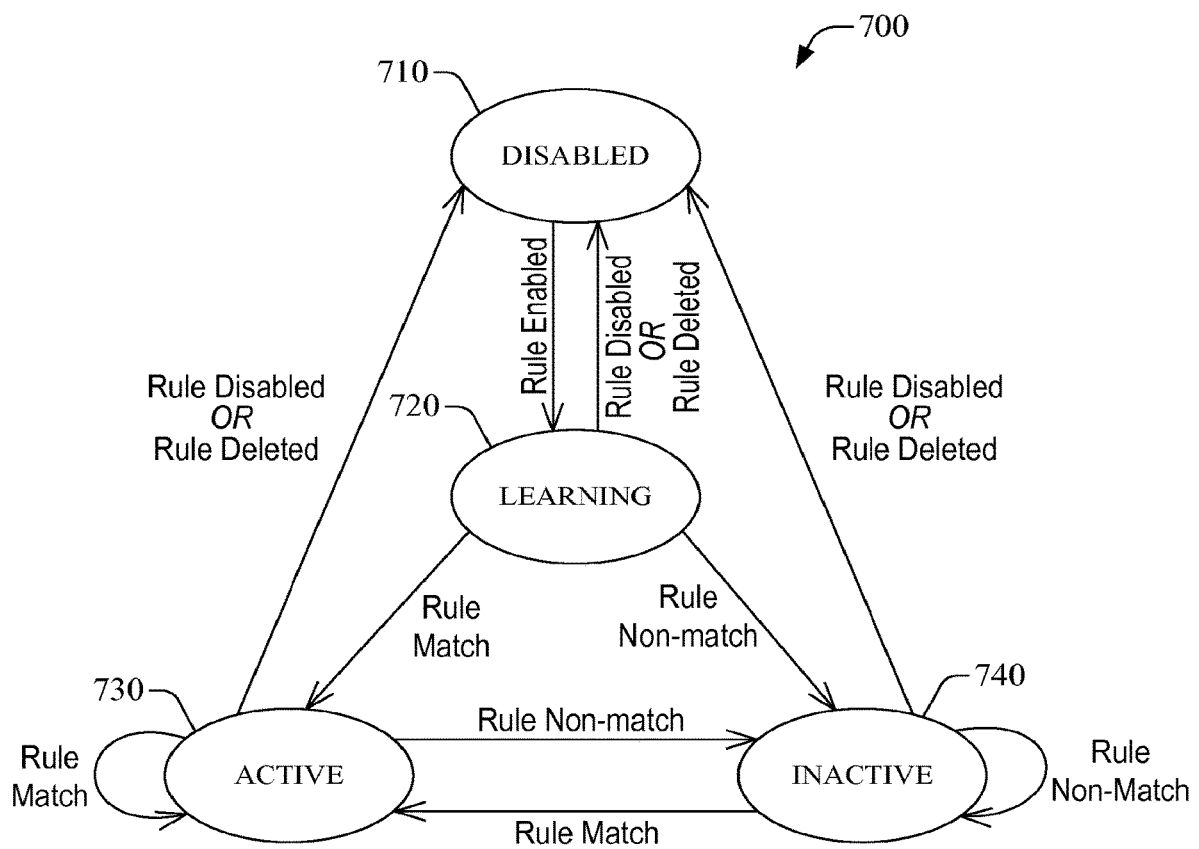
FIG. 7 presents another example of a state machine associated with alert monitoring in accordance with one or more embodiments of the disclosure.

FIG. 7 illustrates an example of a state machine associated with assessment in alert mode in accordance with one or more embodiments of the disclosure. As described herein, in alert mode, a host device can generate alarm information indicative or otherwise representative of an active alarm condition in response to an outcome of a test satisfying a matching criterion. In addition or in other embodiments, the host device can generate alarm information indicative of an inactive alarm condition in response to the outcome of the test not satisfying the matching criterion. The host device also can generate control information indicative or otherwise representative of the test being deleted or explicitly disabled. Therefore, the state machine shown in FIG. 7 presents states that can be represented by the alarm information generated and/or output by the host device that implements a test in alarm mode, and transitions among those states. Specifically, the host device can generate alarm information indicative of state 710, e.g., alarm mode disabled, in response to receiving information indicative of a test or rule being explicitly disabled or deleted. The state machine shown in FIG. 7 can transition to state 710 from any other of states 720, 730, and 740 during assessment of the operational state of a computing component associated with the host device. In response to receiving information indicative of a test in alarm mode, the state machine can transition from state 710 to state 720, alarm mode enabled or "learning" which can represent a state in which operational state of the host device is monitored. In response to an outcome of the test in alarm mode satisfying a matching criterion, the state machine can transition from state 720 to state 730, alarm active, representing the presence of an alarm condition. As illustrated, the state machine remains in the state 730 as long as the alarm condition is present, e.g., the matching criterion is satisfied, or the test is explicitly disabled or deleted. In a scenario in which the outcome of the test in alarm mode does not satisfy the matching criterion, the state machine shown in FIG. 7 can transition from either state 720 or 730 to state 740, alarm inactive, representing absence of an alarm condition. As illustrated, the state machine remains in the state 740 as long as the alarm condition is absent, e.g., the matching criterion is not satisfied, or the test is explicitly disabled or deleted. The state machine can transition from the state 740 to the state 730 in response to an outcome of the test satisfying the matching criterion.

In view of the aspects described herein, example methods that can be implemented in accordance with this disclosure can be better appreciated with reference to FIGS. 8-12. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, one or more example methods disclosed herein can alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages described herein. It should be further appreciated that the example methods disclosed throughout the subject specification are capable of being stored on an article of manufacture to facilitate transporting and transferring such example methods to computers for execution, and thus implementation, by a processor or for storage in a memory.

Methods disclosed throughout the subject specification and annexed drawings are capable of being stored on an article of manufacture to facilitate transporting and transferring such methodologies to computers or other types of information processing machines for execution, and thus implementation, by a processor or for storage in a memory device or another type of computer-readable storage device. In one example, one or more processors that enact a method or combination of methods described herein can be utilized to execute programming code instructions retained in a memory device, or any computer- or machine-readable storage device or non-transitory media, in order to implement method(s) described herein. The programming code instructions, when executed by the one or more processor implement or carry out the various acts in the method(s) described herein. The programming code instructions provide a computer- or machine-executable framework to enact the method(s) described herein. More specifically, yet not exclusively, each block of the flowchart illustrations and/or combinations of blocks in the flowchart illustrations can be implemented by the programming code instructions.

Figure 8:
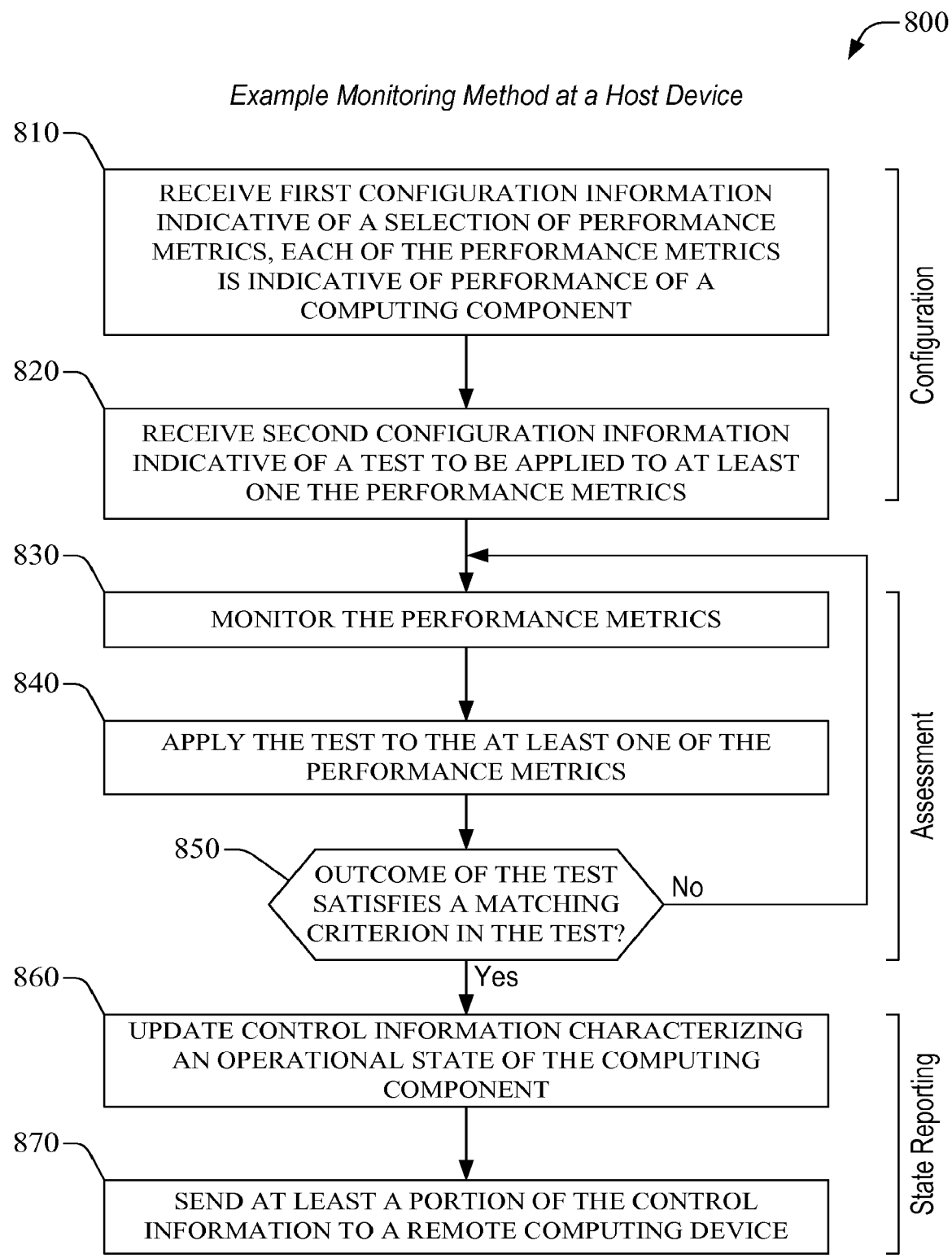
FIG. 8 presents an example of a method for monitoring operational state of a computing component in accordance with one or more embodiments of the disclosure.

FIG. 8 presents a flowchart of an example method 800 for monitoring an operational state of a computing component in a computing environment in accordance with one or more embodiments of the disclosure. The example method can be implemented, entirely or in part, by a host device (or another type of computing device) having processors, memory devices, and/or other computing resources. In some embodiments, the host device can include the functionality of the host device 150, the host device 410, the host device 510, the host device 610, and/or the host device 710. At block 810, the host device can receive first configuration information indicative or otherwise representative of a selection of performance metrics. In one implementation, the first configuration information can be embodied in or can include the metric(s) selection 112 described in connection with FIG. 1. At least a portion of the first configuration information can originate at, and can be received from, a computing device that is remotely located from the host device. For instance, the computing device can be embodied in or can constitute the management console 110. As described herein, each (or, in some implementations, at least one) of the performance metrics can be indicative or otherwise representative of performance of a computing component. As such, the performance metrics, individually and/or collectively, can be indicative or otherwise representative of an operational state of the computing component. The performance metrics can be analyzed (in real-time or otherwise) in order to generate information that can characterize operational states of the computing device. The performance metrics can include one or more of the performance metrics in accordance with this disclosure. For instance, the performance metrics can include CPU usage percentage, CPU usage time, memory usage (in percentage or in absolute magnitude), hard drive disk (HDD) usage, I/O HDD operations, I/O network operations, available inbound network bandwidth, available outbound network bandwidth; packets reordered; packets dropped; response time (e.g., time to first byte associated with a request for service); request rate (e.g., a number of requests for service); a combination thereof; or the like. As further described herein, in some embodiments, the computing component can be embodied in or can include the host device, an application executing in the host device, a virtual machine executing in the host device, or a container (or containerized application) executing in the host device.

At block 820, the host device can receive second configuration information indicative or otherwise representative of a test to be applied to at least one of the performance metrics. At least a portion of the second configuration information can originate at, and can be received from, the computing device (e.g., management console 110) at which the first configuration information can be originated. In one implementation, the second configuration information can be embodied in or can include the rule(s) 116 described in connection with FIG. 1. Thus, one or more rules (e.g., a singleton rule and/or a compound rule) can be associated with the test. As depicted, blocks 810 and 820 can represent a configuration stage associated with the example method. As described, implementation of the configuration stage can result, for example, in the host device being configured with a defined non-empty set of performance metrics and a defined test to probe an operational state of the computing component associated with the host device. The configuration stage can be implemented, in some embodiments, at runtime during execution of an analysis agent module (e.g., assessment module 156) at the host device.

At block 830, the host device can monitor the performance metrics in the received selection. To that end, as described herein, an assessment module executing in the host device can access or otherwise obtain information indicative of a performance metric. The information can be accessed, for example, continually (or in real-time), nearly continually (or nearly real-time), periodically, according to a schedule, and/or in response to a specific event. In one implementation, monitoring the operational metrics can include determining at least one of first data indicative of CPU usage percentage, second data indicative of CPU usage time, third data indicative of memory usage, fourth data indicative of hard drive disk usage, fifth data indicative of I/O HDD operations, sixth data indicative of I/O network operations, seventh data indicative of available inbound network bandwidth, eighth data indicative of available outbound network bandwidth, ninth data indicative of packets dropped, tenth data indicative of packets reordered, eleventh data indicative of response time (e.g., time to first byte associated with a request for service), or twelfth data indicative of request rate (e.g., a number of requests for service).

At block 840, the host device can apply the test indicated or otherwise represented by the second configuration information to at least one of the performance metrics. As described herein, the assessment module executing in the host device can apply the test. At block 850, the host device can determine whether an outcome of the test satisfies a matching criterion in the test. In one scenario (e.g., "No" branch), the host device can determine that the outcome of the test does not satisfy the matching criterion in the test. In response, the example method 800 can proceed to block 830, in which the performance metrics can be further monitored. As described herein, the assessment module executing in the host device can perform or otherwise facilitate such a determination. In another scenario (e.g., "Yes" branch), the host device can determine that the outcome of the test satisfies the matching criterion in the test. In response, the example method 800 can proceed to block 850. As described herein, the assessment module executing in the host device also can perform or otherwise facilitate such a determination.

As depicted, blocks 830, 840, and 850 can represent an assessment stage associated with the example method. Implementation of the assessment stage can probe, for example, operational states of the computing component associated with the host device. The outcome of the test can characterize such an operational state. It is noted that the assessment stage also can be implemented based on satisfying the logical complement of the matching criterion. At block 860, the host device can update control information (e.g., signaling 118 depicted in FIG. 1) characterizing an operational state of the computing component associated with the host device—e.g., a virtual machine executing at the host device, a container executing at the host device, and/or the host device itself. As described herein, in one embodiment, updating the control information characterizing the operational state can include generating event information indicative of an occurrence of a specific condition defined by the matching criterion in the test applied at block 840. In addition or in another embodiment, updating the control information characterizing the operational state can include generating alarm information indicative or otherwise representative of an active alarm condition. At block 870, the host device can send at least a portion of the control information to a remote computing device, such as the computing device that originates the first configuration information and the second configuration information.

As depicted, blocks 860 and 870 can represent a state reporting stage associated with the example method. Implementation of the state reporting stage can provide, for example, signaling that characterizes operational states of the computing component associated with the host device that implements the example method.

Figure 9A:
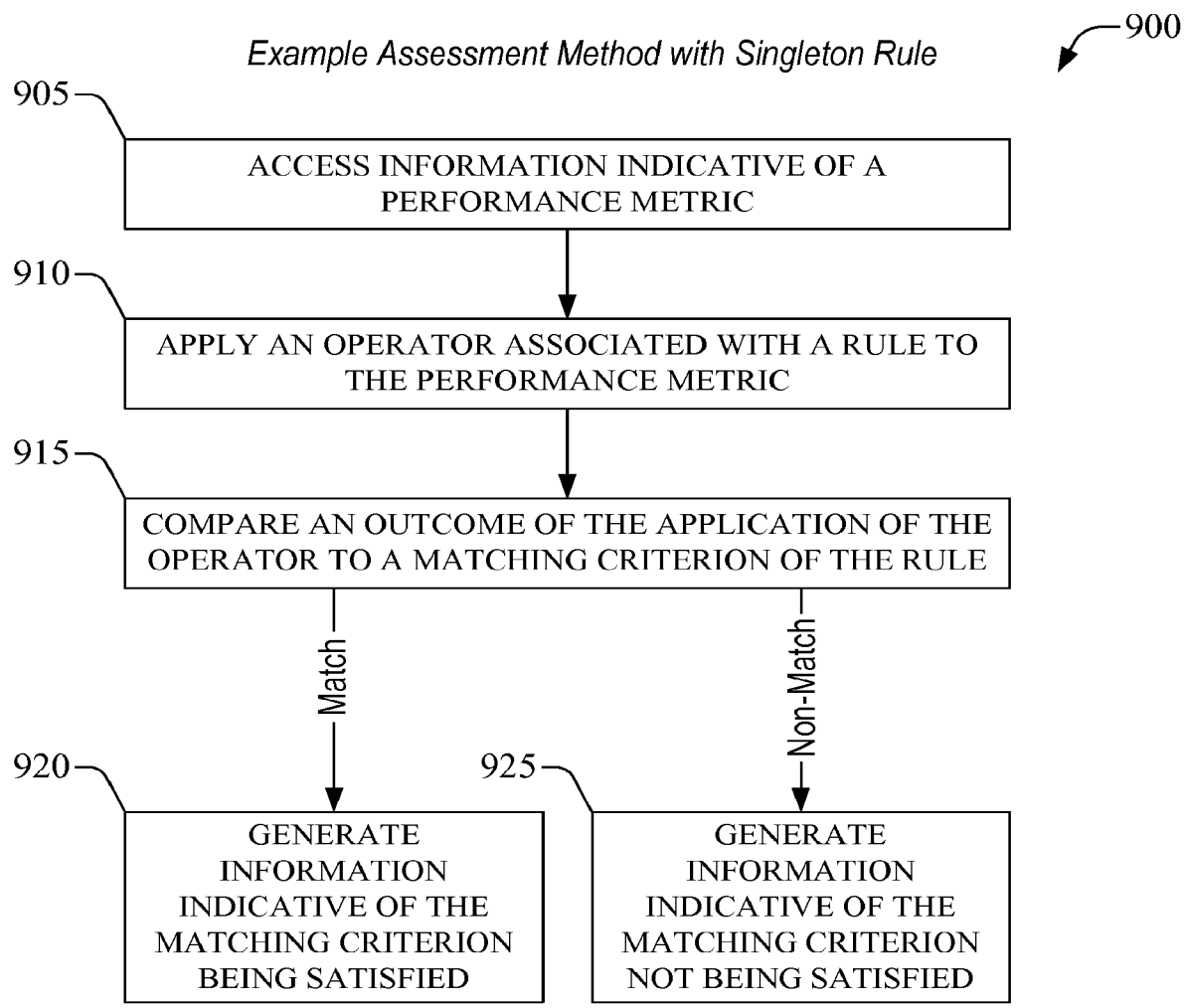
FIG. 9A presents an example of a method for assessing a rule associated with an operational state of a computing component in accordance with one or more embodiments of the disclosure.

FIG. 9A presents a flowchart of an example method 900 for performing or otherwise facilitating an assessment stage in accordance with one or more embodiments of the disclosure. Thus, in some implementations, the example method 900 can embody or can constitute the assessment state represented collectively by blocks 830, 840, and 850. The example method can be implemented, entirely or in part, by a host device (or another type of computing device) having processors, memory devices, and/or other computing resources. In some embodiments, the host device can include the functionality of the host device 150, the host device 210, the host device 310, the host device 410, and/or the host device 510.

At block 905, the host device can access information indicative or otherwise representative of a performance metric—e.g., CPU usage, memory storage usage, available inbound bandwidth, available outbound bandwidth, request rate, response time, or the like. In one implementation, accessing the information can constitute monitoring the information and, in accordance with the assessment stage described in connection with the example method 800 shown in FIG. 8, the information can be accessed in real-time, nearly real-time, periodically or non-periodically, according to a schedule, or in response to a specific condition. At block 910, the host device can apply an operator associated with a rule (e.g., a singleton rule described herein) to the performance metric. At block 915, the host device can compare an outcome of the application of the operator to a matching criterion of the rule. In response to a result of the comparison indicating that the outcome satisfies the matching criterion (e.g., "Match" branch), the host device can generate, at block 920, information (e.g., a control interruption) indicative or otherwise representative of the matching criterion being satisfied. In the alternative, in response to the comparison indicating that the outcome does not satisfies the matching criterion (e.g., "Non-match" branch), the host device can generate, at block 925, information (e.g., a control interruption) indicative off the matching criterion not being satisfied. It is noted that, while not shown, the information generated at block 920 and/or block 925 can be supplied or otherwise can be made available to a component of the host device or another component thereof that implements the example method 900.

Figure 9B:
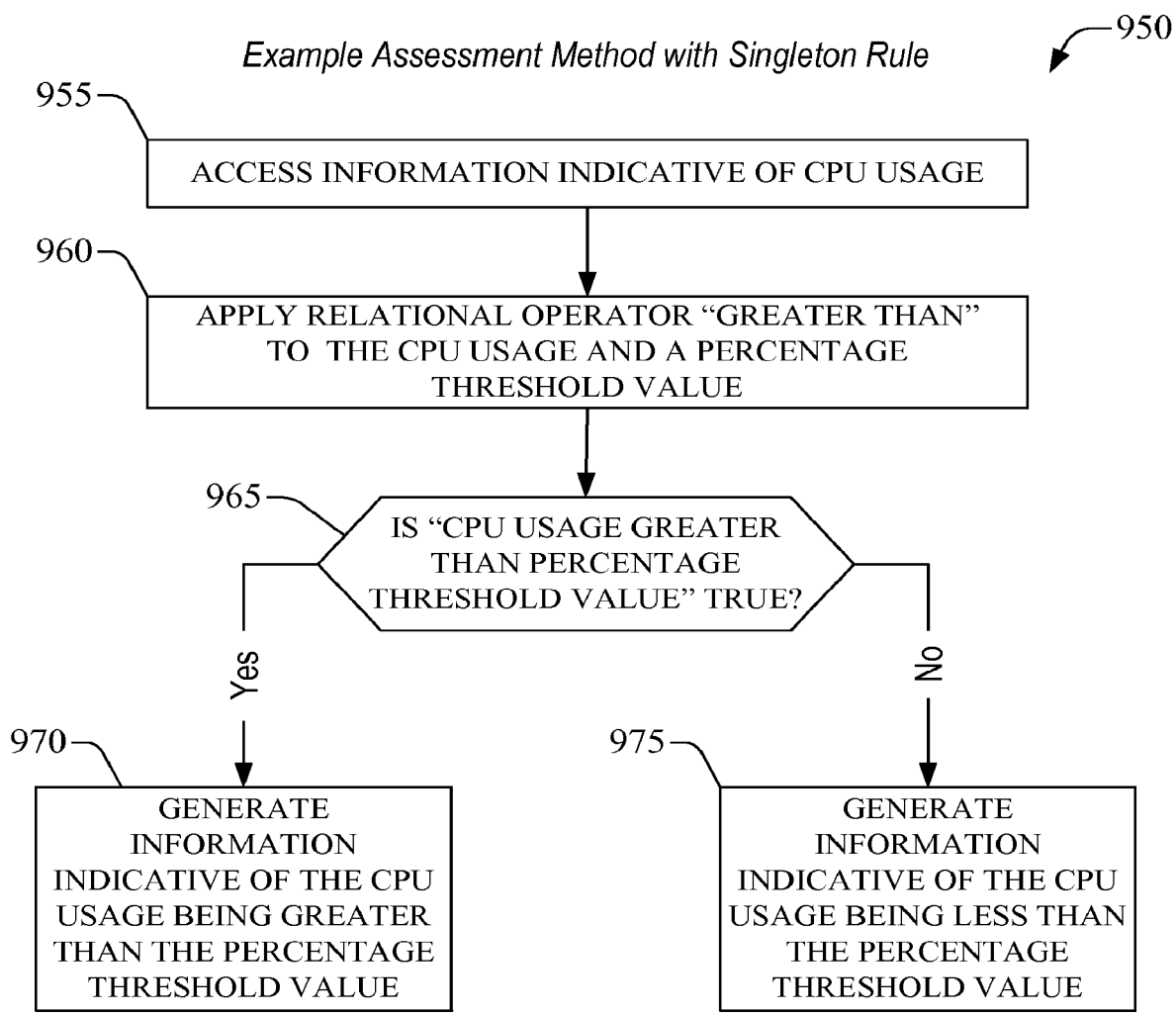
FIG. 9B presents an example of another method for assessing a rule associated with an operational state of a computing component in accordance with one or more embodiments of the disclosure.

As described herein, various performance metrics can be relied upon in order to monitor and/or characterize an operational state of a computing component associated with a host device. In addition, a number of operators and matching criteria can be relied upon in order to probe such an operational state. Therefore, as an illustration, FIG. 9B present a flowchart of an example method 950 for performing or otherwise facilitating the assessment of the example method 900 for a particular performance metric and singleton rule. As illustrated, at block 955, the host device can access information indicative of CPU usage (which can be expressed as a percentage). In one example, the host device can implement a system call that can generate such information. At block 960, relational operator "greater than" can be applied to the CPU usage and a percentage threshold value. As described herein, such a relational operator and/or the percentage threshold value can be configured externally, via, for example, configuration information received at the host device. At block 965, the host device can determine whether the statement "CPU usage greater than percentage threshold value" has a logical value equal to true. In response to a positive determination (e.g., "Yes" branch), at block 970, the host device can generate information indicative of the CPU usage being greater than the percentage threshold. In the alternative, in response to a negative determination (e.g., "No" branch), at block 975, the host device can generate information indicative of the CPU usage being less than the percentage threshold value.

Figure 10A:
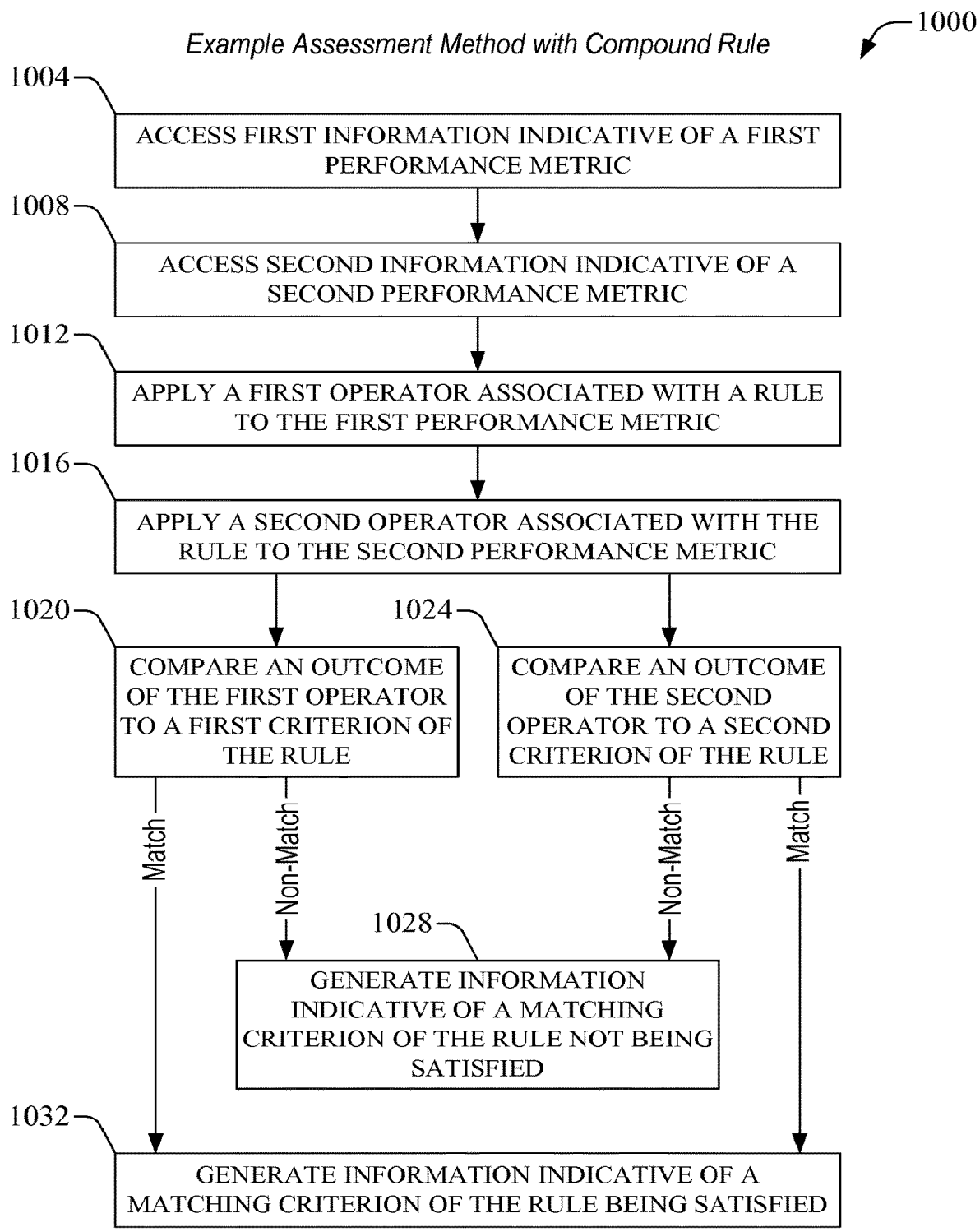
FIG. 10A presents an example of yet another method for assessing a rule associated with an operational state of a computing component in accordance with one or more embodiments of the disclosure.

FIG. 10A presents a flowchart of an example method 1000 for performing or otherwise facilitating an assessment stage in accordance with one or more embodiments of the disclosure. Thus, in some implementations, the example method 1000 can embody or can constitute the assessment state represented collectively by blocks 830, 840, and 850. The example method 1000 can be implemented, entirely or in part, by a host device (or another type of computing device) having processors, memory devices, and/or other computing resources. In some embodiments, the host device can include the functionality of the host device 150, the host device 410, the host device 510, the host device 610, and/or the host device 710. At block 1004, the host device can access first information indicative or otherwise representative of a first performance metric. At block 1008, the host device can access second information indicative or otherwise representative of a second performance metric. At block 1012, the host device can apply a first operator associated with a rule (e.g., a compound rule described herein) to the first performance metric. At block 1016, the host device can apply a second operator associated with the rule to the second performance metric. At block 1020, the host device can compare an outcome of the first operator to a first criterion of the rule. At block 1024, the host device can compare an outcome of the second operator to a second criterion of the rule. It is noted that, in the illustrated example, the respective comparisons at blocks 1020 and 1024 are performed independently of each other-either concurrently or non-concurrently according to a specific implementation order. In response to (i) a result of the comparison at block 1020 indicating that the outcome of the first operator does not satisfy the first criterion of the rule or (ii) a result of the comparison at block 1024 indicating that the outcome does not satisfy the second criterion, the host device can generate, at block 1028, information indicative of a matching criterion of the rule not being satisfied. In the alternative, in response to (a) a result of the comparison at block 1020 indicating that the outcome of the first operator satisfies the first criterion of the rule and (b) a result of the comparison at block 1024 indicating that the outcome satisfies the second criterion of the rule, the host device can generate, at block 1032, information indicative of a matching criterion of the rule being satisfied.

Figure 10B:
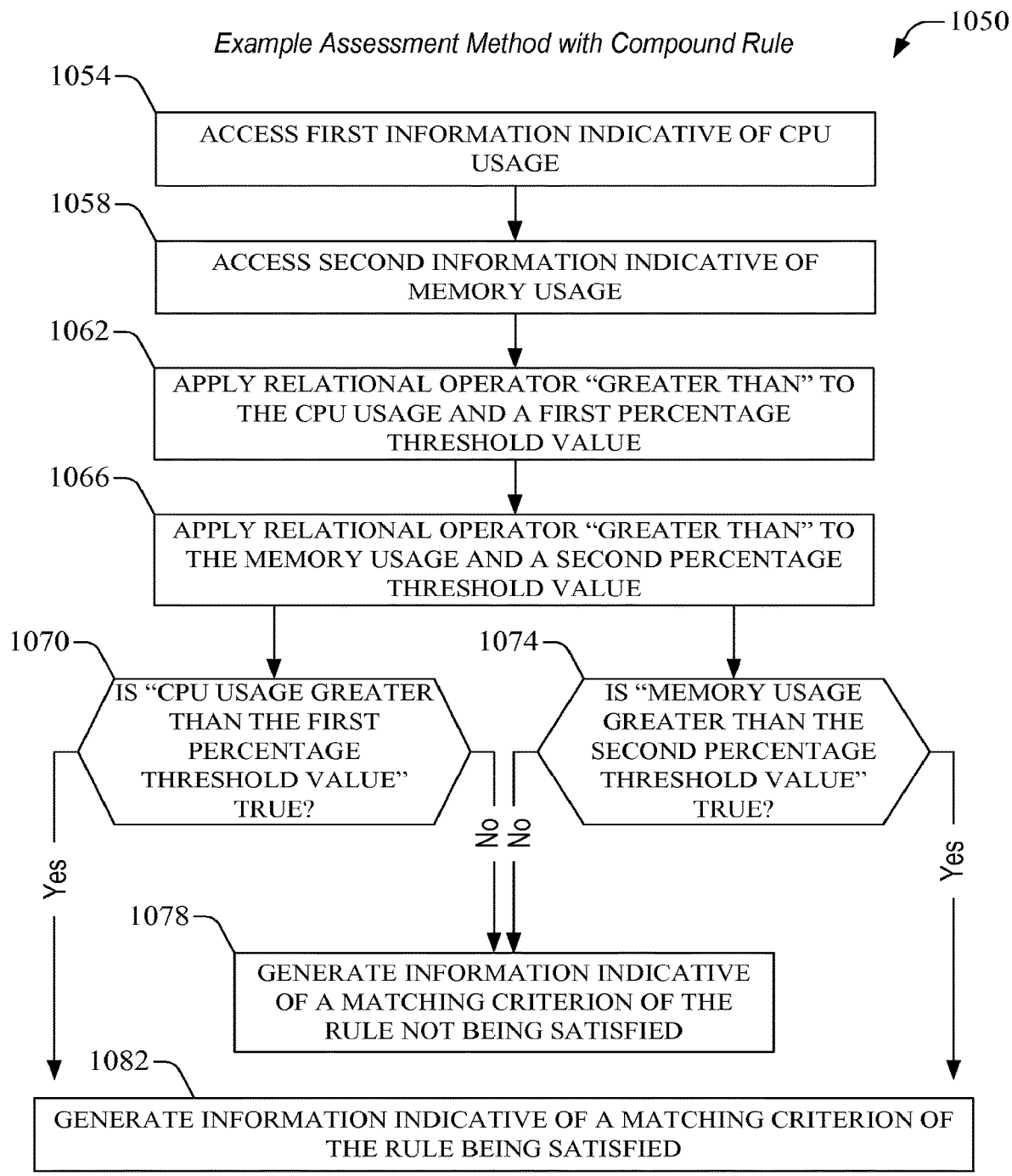
FIG. 10B presents an example of still another method for assessing a rule associated with an operational state of a computing component in accordance with one or more embodiments of the disclosure.

Similar to the example method 950, FIG. 10B presents a flowchart of an example method 1050 for performing or otherwise facilitating the assessment of the example method 1000 for a particular performance metric and a compound rule. For the sake of illustration, and not limitation, the compound rule is associated with two performance metrics: CPU usage and memory usage. As illustrated, at block 1054, the host device can access information indicative of CPU usage (which can be expressed as a percentage). At block 1058, the host device can access second information indicative of memory usage. At block 1062, the host device can apply the relational operator "greater than" to the CPU usage and a first percentage threshold value. At block 1066, the host device can apply the relational operator "greater than" to the memory usage and a second percentage threshold value. As described herein, the first percentage value, the second percentage value, and/or utilization of such a relational operator can be configured externally, via, for example, configuration information received at the host device. At block 1070, the host device can determine whether the statement "CPU usage greater than the first percentage threshold value" has a logical value equal to true. At block 1074, the host device can determine whether the statement "memory usage greater than the second percentage threshold value" has a logical value equal to true. In response to (I) a determination that the statement "CPU usage greater than the first percentage threshold value" does not have a logical value that is equal to true (e.g., "No" branch) or (ii) a determination that the statement "memory usage greater than the second percentage threshold value" does not have a logical value that is equal to true (e.g., "No" branch), the host device can generate, at block 1078, information indicative of a matching criterion of the rule not being satisfied. In the alternative, in response to (A) a determination that the statement "CPU usage greater than the first percentage threshold value" has a logical value that is equal to true (e.g., "Yes" branch) or (B) a determination that the statement "memory usage greater than the second percentage threshold value" has a logical value that is equal to true (e.g., "Yes" branch), the host device can generate, at block 1082, information indicative of a matching criterion of the rule being satisfied.

Figure 11A:
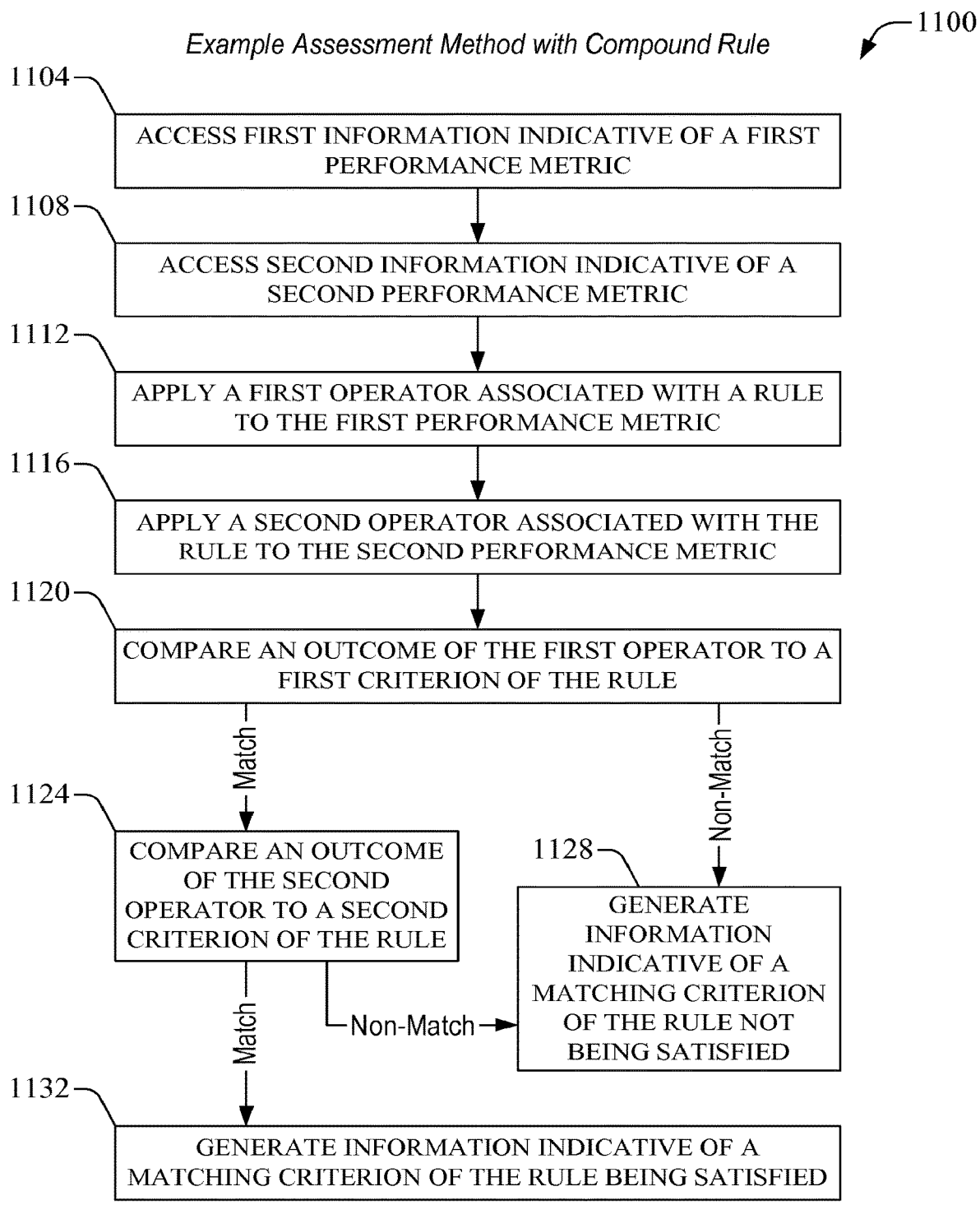
FIG. 11A presents an example of another method for assessing a rule associated with an operational state of a computing component in accordance with one or more embodiments of the disclosure.

As described herein, an assessment via a compound rule can be based at least on whether outcomes of two or more rules (or, more generally, test(s)) satisfy respective criteria independently and concurrently. However, another assessment via a compound rule can be based at least on whether outcomes of two or more other rules (or, more generally, other test(s)) satisfy respective criteria in a defined sequence (or order). As such, FIG. 11A presents a flowchart of example method 1100 for performing or otherwise facilitating an assessment stage, via a compound rule, in accordance with one or more embodiments of the disclosure. In some implementations, the example method 1100 can embody or can constitute the assessment state represented collectively by blocks 830, 840, and 850. The example method 1000 can be implemented, entirely or in part, by a host device (or another type of computing device) having processors, memory devices, and/or other computing resources. In some embodiments, the host device can include the functionality of the host device 150, the host device 410, the host device 510, the host device 610, and/or the host device 710. At block 1104, the host device can access first information indicative or otherwise representative of a first performance metric. At block I/O 8, the host device can access second information indicative or otherwise representative of a second performance metric. At block 1112, the host device can apply a first operator associated with a rule (e.g., a compound rule described herein) to the first performance metric. At block 1116, the host device can apply a second operator associated with the rule to the second performance metric. At block 1120, the host device can compare an outcome of the first operator to a first criterion of the rule. In response to a result of the comparison indicating that the outcome of the first operator does not satisfy the first criterion (e.g., "Non-match" branch), the host device can generate, at block 1128, information indicative of a matching criterion of the rule not being satisfied. In the alternative, at block 1124, the host device can compare an outcome of the second operator to a second criterion of the rule. In response to a result of the comparison at block 1124 indicating that the outcome of the second operator does not satisfy the second criterion of the rule, flow can proceed to block 1128. In the alternative, in response to a result of the comparison at block 1124 indicating that the outcome of the second operator satisfies the second criterion of the rule, the host device can generate, at block 1132, information indicative of the matching criterion of the rule being satisfied.

Figure 11B:
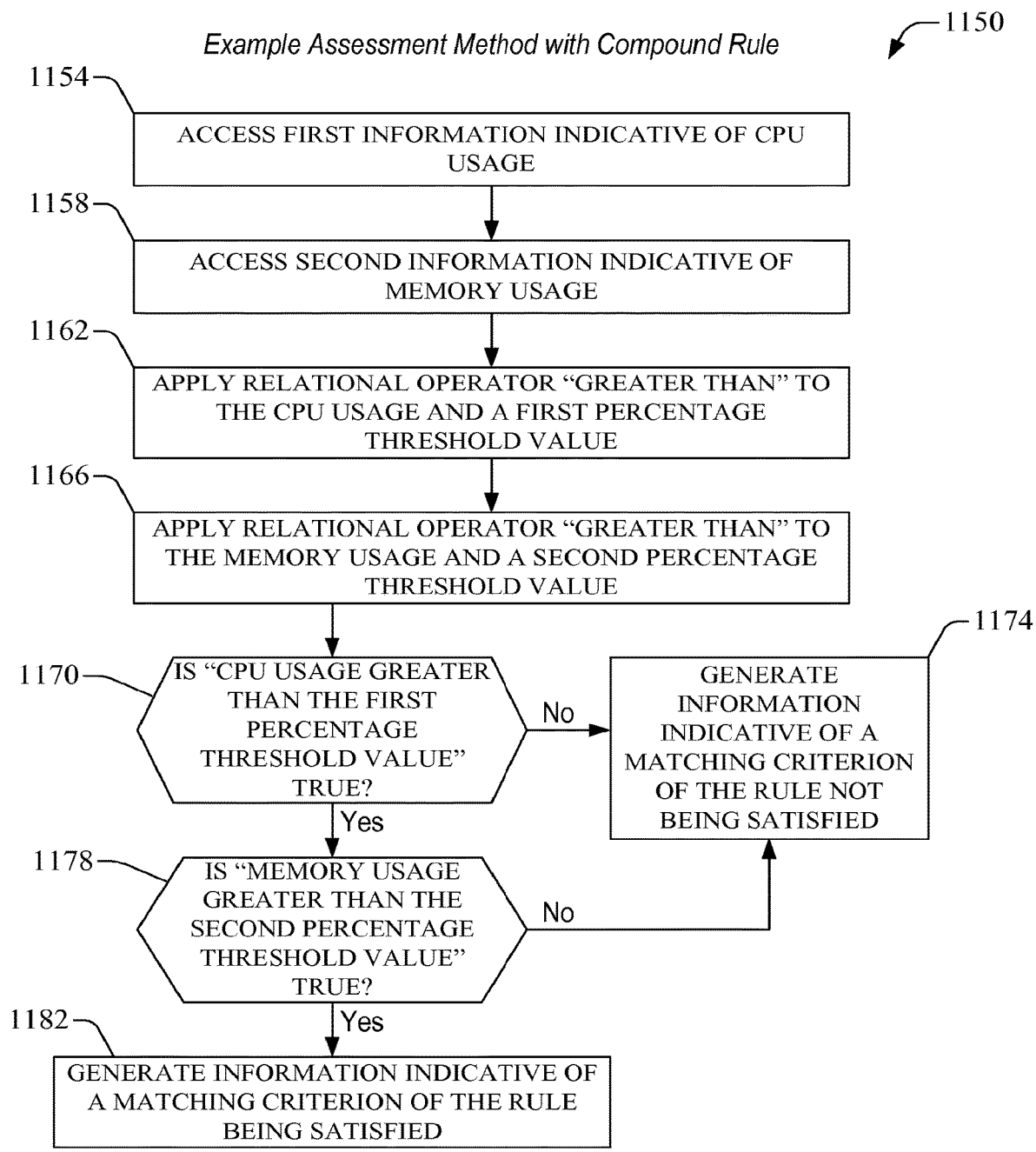
FIG. 11B presents an example of yet another method for assessing a rule associated with an operational state of a computing component in accordance with one or more embodiments of the disclosure.

In order to illustrate, not limit, the example method 1100 with a specific assessment implementation, FIG. 11B presents a flowchart of an example method 1150 for performing or otherwise facilitating an assessment stage via a particular compound rule and particular performance metrics—e.g., CPU usage and memory usage. At block 1154, a host device can access information indicative of CPU usage. At block 1158, the host device can access second information indicative of memory usage. At block 1162, the host device can apply the relational operator "greater than" to the CPU usage and a first percentage threshold value. At block 1066, the host device can apply the relational operator "greater than" to the memory usage and a second percentage threshold value. As described herein, the first percentage value, the second percentage value, and/or utilization of such a relational operator can be configured externally, via, for example, configuration information received at the host device.

At block 1170, the host device can determine whether the statement "CPU usage greater than the first percentage threshold value" has a logical value equal to true. In response to ascertaining that such a statement does not have a logical value equal to true (e.g., "No" branch), the host device can generate, at block 1174, information indicative of a matching criterion of the rule not being satisfied. In the alternative, in response to ascertaining that such a statement has a logical value equal to true (e.g., "Yes" branch), the host device can determine, at block 1178, whether the statement "memory usage greater than the second percentage threshold value" has a logical value equal to true. In response to ascertaining that such a statement does not have a logical value that is equal to true (e.g., "No" branch), the flow of the example method can proceed to block 1174. In the alternative, in response to ascertaining that such the statement "memory usage greater than the second percentage threshold value" has a logical value that is equal to true (e.g., "Yes" branch), the host device can generate, at block 1182, information indicative of the matching criterion of the rule being satisfied.

Figure 12:
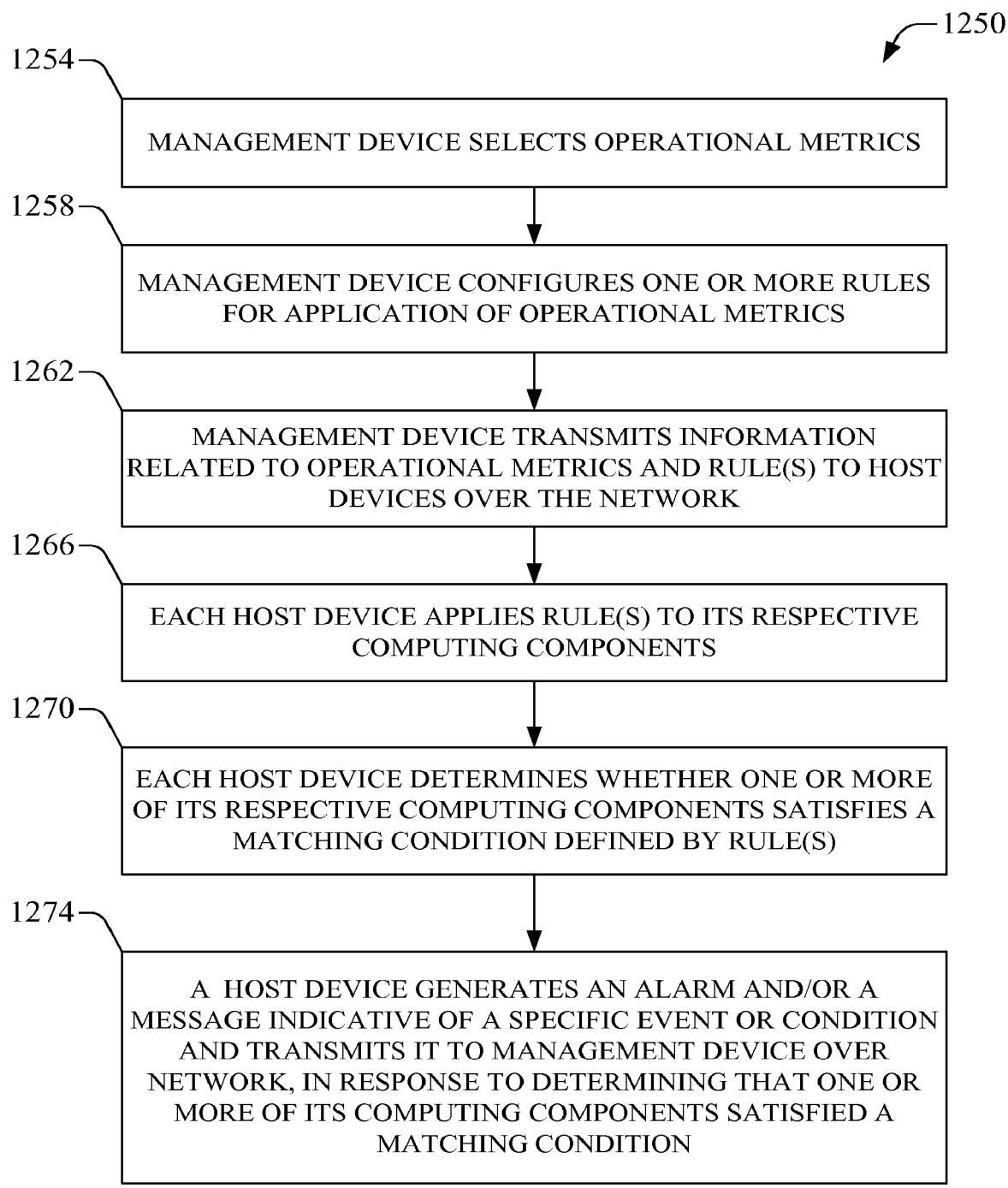
FIG. 12 presents an example of a method for monitoring host devices over a network in accordance with one or more embodiments of the disclosure.

FIG. 12 presents a flowchart of an example method 1250 of communication between the management (or computing or configuration) device and the host devices, in accordance with one or more embodiments of the disclosure. The communication can occur over a network, for example, a cloud network. The host devices can include hundreds or thousands or tens of thousands of servers in a server farm. At block 1254, the management component/device selects the operational (or performance) metrics for testing of the host devices and their respective computing components (e.g. VM and containers). At block 1258, the management component configures one or more rules for applying (or comparing) the performance metrics to operating conditions at the host devices and their respective computing devices. At block 1262, the management component transmits the metrics and the rules for applying the metrics to the host devices—over the network. Specifically, the metrics and the rules are delivered to every host device, potentially to thousands of host devices. At block 1266, each host device tests its performance levels and that of its associated computing devices by applying the rules received from the management device. At block 1270, the host device determines if it or any of its computing devices satisfies matching conditions defined by the rules. If a matching condition is satisfied, at block 1274, the host device transmits a message (e.g. an alarm or a message indicating that a specific event or condition has occurred) to the management component, over the network. In case no matching conditions defined by the rules were satisfied, the host device can transmit no message or transmit a message indicating that no matching conditions were satisfied.

Figure 13:
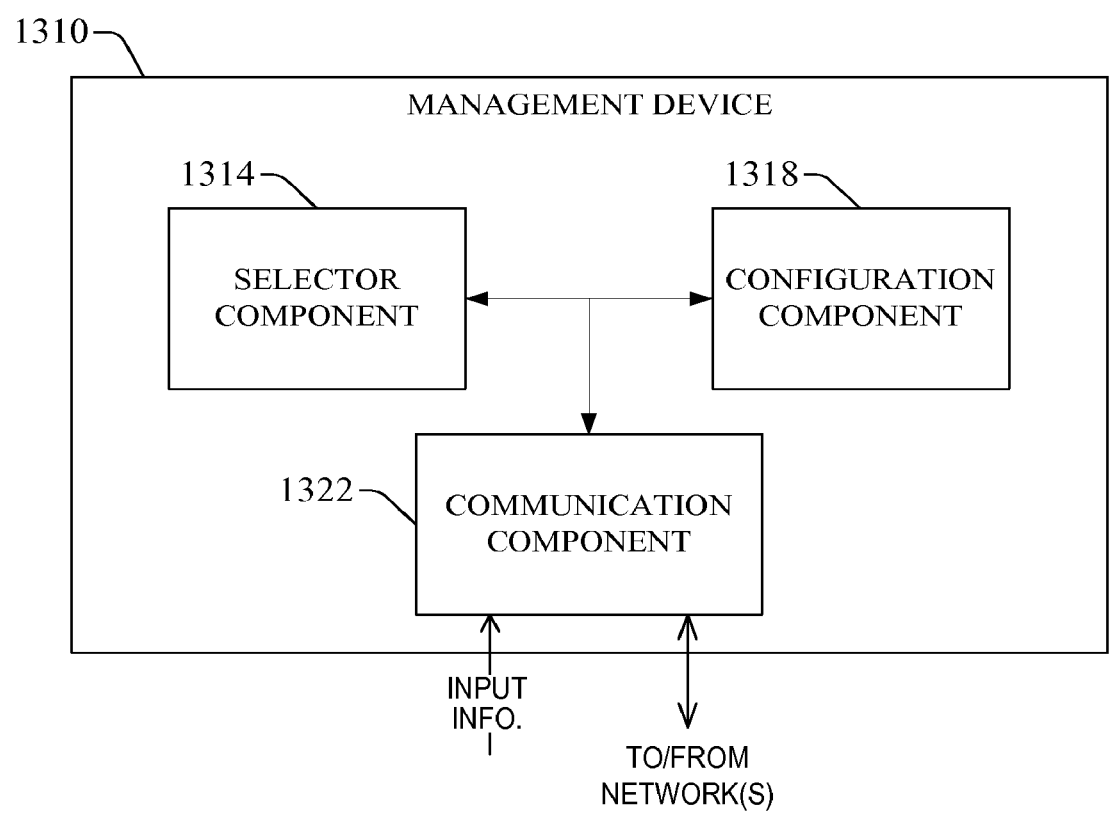
FIGS. 13-14 present examples of management devices in accordance with one or more embodiments of the disclosure.

FIG. 13 illustrates an example management device 1310 in accordance with one or more embodiments of this disclosure. In some embodiments, the management device 1310 can be implemented in firmware. As illustrated, the management device 1310 includes a selector component 1314, a configuration component 1318, and a communication component 1322 that are operationally coupled (e.g., communicatively coupled) to each other. A bus architecture (or bus) can permit the exchange of data, metadata, and/or signaling between two or more of such components. The selector component 1314 can be configured to select operational metrics, each indicative or otherwise representative of performance of a computing component (e.g., a host device, an application, a VM, or a container). The selector component 1314 also can be configured to select a group of computing components for assessment of their performance. The group of computing components can include at least one of the host device, a virtual machine configured to execute on the host device, or a container configured to execute on the host device. To that end, in one embodiment, the management device can utilize or otherwise rely on an 0/S that can provide a list of available of computing components in a group of networked host devices (e.g., a data center, a server farm, or the like). Such an 0/S also can provide with respective communication addresses (e.g., an IP address) of the group of computing components, where a communication address can uniquely identify a computing component in order to permit or otherwise facilitate communication between the computing component and the management device 1310.

The selector component 1314 also can be configured to select one of an alarm mode of assessment of a group of computing components or an event mode of assessment of the group of computing components. As such, in one example, the selector component 1314 can receive selection information indicative of a first selection of the alarm mode or a second selection of the event mode. The selection information can be received via the communication component 1322 as described herein. In alarm mode, as described herein, assessment of a computing component (e.g., a host device) can result in control information (e.g., signaling 118) being received at the management device 1310 in response to a matching criterion of a rule being satisfied by one or more operational metrics. Such control information can be indicative or otherwise representative of an alarm being active. Similarly, in event mode, in response to a matching criterion of a rule being satisfied by one or more operational metrics, the management device can receive control information including event information indicative of an occurrence of a defined event. In certain implementations, the defined event can represent a transition from a first operational state to a second operational state. The first operational state can have associated therewith first values of respective operational metrics or a function thereof, and the second operational state can have associated therewith second values of the respective operational metrics or the function thereof. As such, defined events can represent such a type of transitions.

The configuration component 1318 can be configured to determine rule(s) that can be applied to at least one of the operational metrics, as described herein. More specifically, a rule of the rule(s) can be based on one or more operational metrics. In one implementation, as described herein, the rule can include a test condition associated with the computing component of the at least one of the group of computing components. The device of claim 1, wherein the at least one of the group of computing components comprises a first computing component and a second computing component, and wherein the rule comprises a first test condition associated with the first computing component and a second test condition associated with the second computing component, and wherein the first test condition and the second test condition are probed in a defined order.

The communication component 1322 can be configured to receive input information (e.g., input info. 104) at the management device 1310. In one embodiment, the communication component 1322 can be include a user interface (e.g., command line or a graphical interface) displayed at a display device, where the user interface is configured to permit or otherwise facilitate input of information into the management device 1310. As described herein, in one example, the input information can permit receiving selection information indicative or otherwise representative of one or more operational metrics. The input information also can permit receiving information indicative or representative of one or more rules in accordance with this disclosure. In addition or in other implementations, the communication component 1322 can be configured to communicate with remote network devices (e.g., host devices) via one or more networks and one or more communication links. In an example embodiment of the subject disclosure, the management component 110 can be implemented into the management device 1310. The communication component 1322 can send first information indicative of a group of operational metrics and second information indicative or otherwise representative of a rule (singleton or compound) to at least one computing component (e.g., a host device, an application, VM, a container) of a group of computing components. As described herein, the group of operational metrics can be selected by the selector component 1314 in response to receiving information. Similarly, the group of computing components can be selected by the selector component 1314 in response to receiving other input information. In addition or in other embodiments, the communication component 1322 can receive control information (e.g., signaling 118) indicative or otherwise representative of an alarm being active or inactive, and/or other control information (other instance of signaling 118) indicative or otherwise representative of occurrence of an event. More generally, in some embodiments, the control information received by the communication component 1322 can be indicative or otherwise representative of the state information associated with the state machines described herein in connection with FIGS. 6-7.

Figure 14:
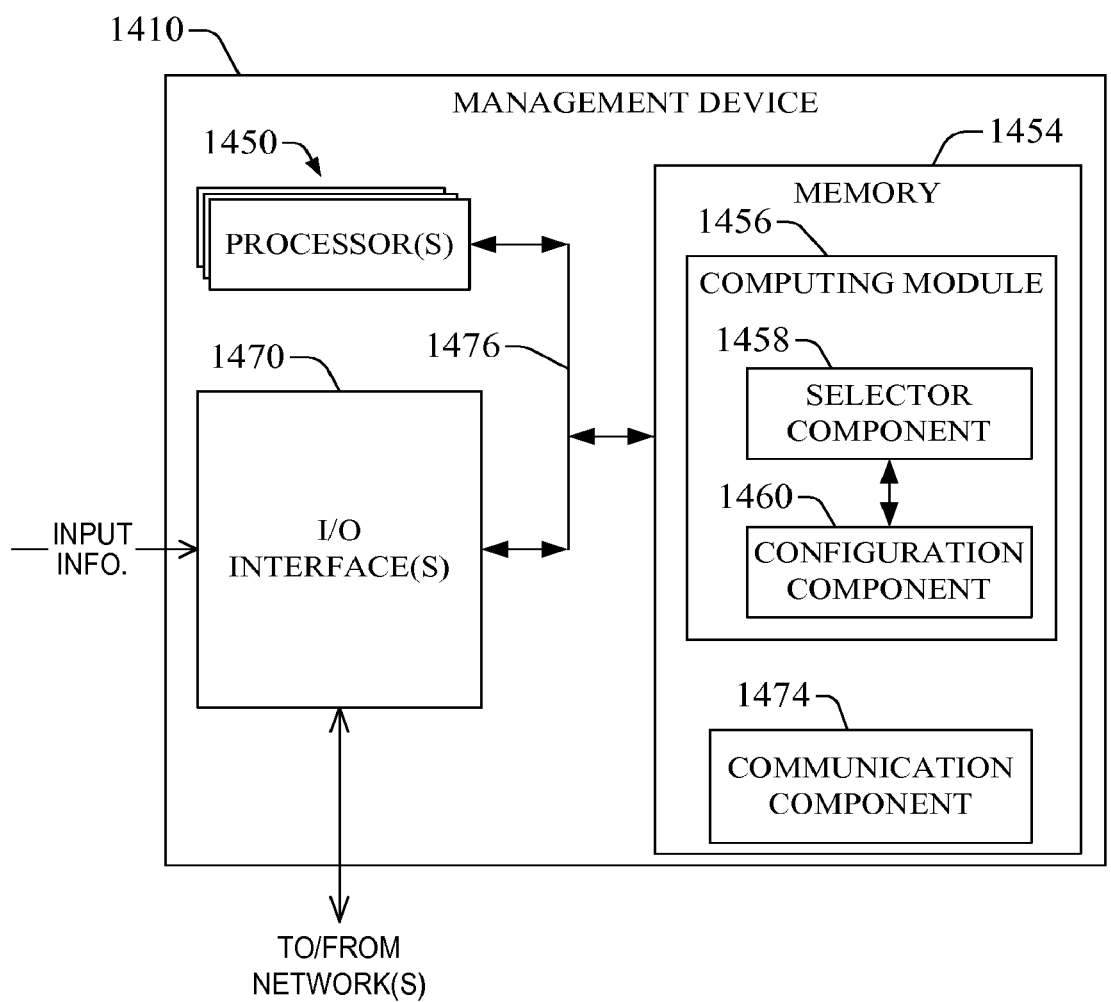

FIG. 14 illustrates an example management device 1410 in accordance with one or more embodiments of the disclosure. The management device 1410 includes one or more processors 1450, one or more computer-readable storage devices 1454 (referred to as memory 1454), and one or more input/output (I/O) interfaces 1470. The processor(s) 1450, the memory 1454, the I/O interface(s) 1470, and the bus 1476 can constitute hardware of the management device 1410. Such hardware can include, for example, sensors, a battery or other type of energy storage devices, circuitry for specific functionality, a combination thereof, or the like. As illustrated, the memory 1454 includes a computing module 1456, which can be embodied in computer-accessible instructions that can be accessed and/or executed by at least one of the processor(s) 1450 to perform or otherwise facilitate operations associated with assessment of a computing device in accordance with this disclosure. As described herein, such operations can include, for example, selection of operational metrics and/or configuration of a rule (singleton or compound rule). More specifically, the computing module 1456 includes computer-accessible instructions that embody a selector component 1458 and other computer-accessible instructions that embody a configuration component 1460. In response to execution by at least one of the processor(s) 1450 the selector component 1458 and the configuration component 1460 can direct or otherwise cause the management device 1410 to perform similar functions to those performed or otherwise facilitated by the selector component 1314 and the configuration component 1318, respectively.

The memory 1454 also includes a communication component 1474 that can configured to receive and/or transmit information from/over a network. To that end, in response to execution by at least one of the processor(s) 1450, the communication component 1474 can direct or otherwise cause the management device 1410 to receive or otherwise access information (e.g., data and/or metadata) according to a specific communication protocol (such as TCP or UDP). At least a portion of such information can be received at the management device 1410 via one or more of the I/O interface(s) (e.g., a touchscreen display device, a command line displayed at a display device, a voice command, a network adaptor, or the like) and can be processed by the communication component 1474. Accordingly, in one instance, the management device 1410 can receive the input information 104 as described herein. In addition or in another instance, the management device 1410 can receive signaling 118 from a remote host device as described herein. In further response to execution by at least one of the processor(s) 1450, the communication component 1474 also can direct or otherwise cause the management device 1410 to send information (e.g., data and/or metadata) to host devices. For instance, execution of the communication component 1474 can direct or otherwise cause the management device 1410 to send first information indicative of a selection of operational metrics to a defined group of computing components (e.g., host(s), application(s), VM(s), and/or container(s). As described herein, the group of computing component can define a scope, which can be specified via input information (e.g., input information 104) received at the management device 104. In addition or in the alternative, execution of the communication component 1474 can direct or otherwise cause the management component 1410 to send second information indicative or otherwise representative of one or more rules to assess a performance state of at least one of the computing components. The one or more rules can be embodied in or can include a rule in accordance with aspects of this disclosure. In one example, the first information can be embodied in or can include the metric(s) selection 112, and the second information can be embodied in or can include the rule(s) 116. In some embodiments, a combination of the communication component 1474 in the memory 1454, at least one of the processor(s) 1450, and at least one of the I/O interface(s) 1470 can embody or can constitute the communication component 1322.

In some embodiments, the computing module 1456 and the communication component 1474 can constitute an 0/S installed in the memory 1454 and suitable to operate operation of the a data center or a server farm. In other embodiments, the computing module 1456 and the communication component 1474 can constitute another 0/S installed in the memory 1454 and suitable to operate the management device 1410, e.g., Linux, Unix, Microsoft Windows, or the like In an example embodiment of the subject disclosure, the management component 110 can be implemented into the management device 1410.

Figure 15:
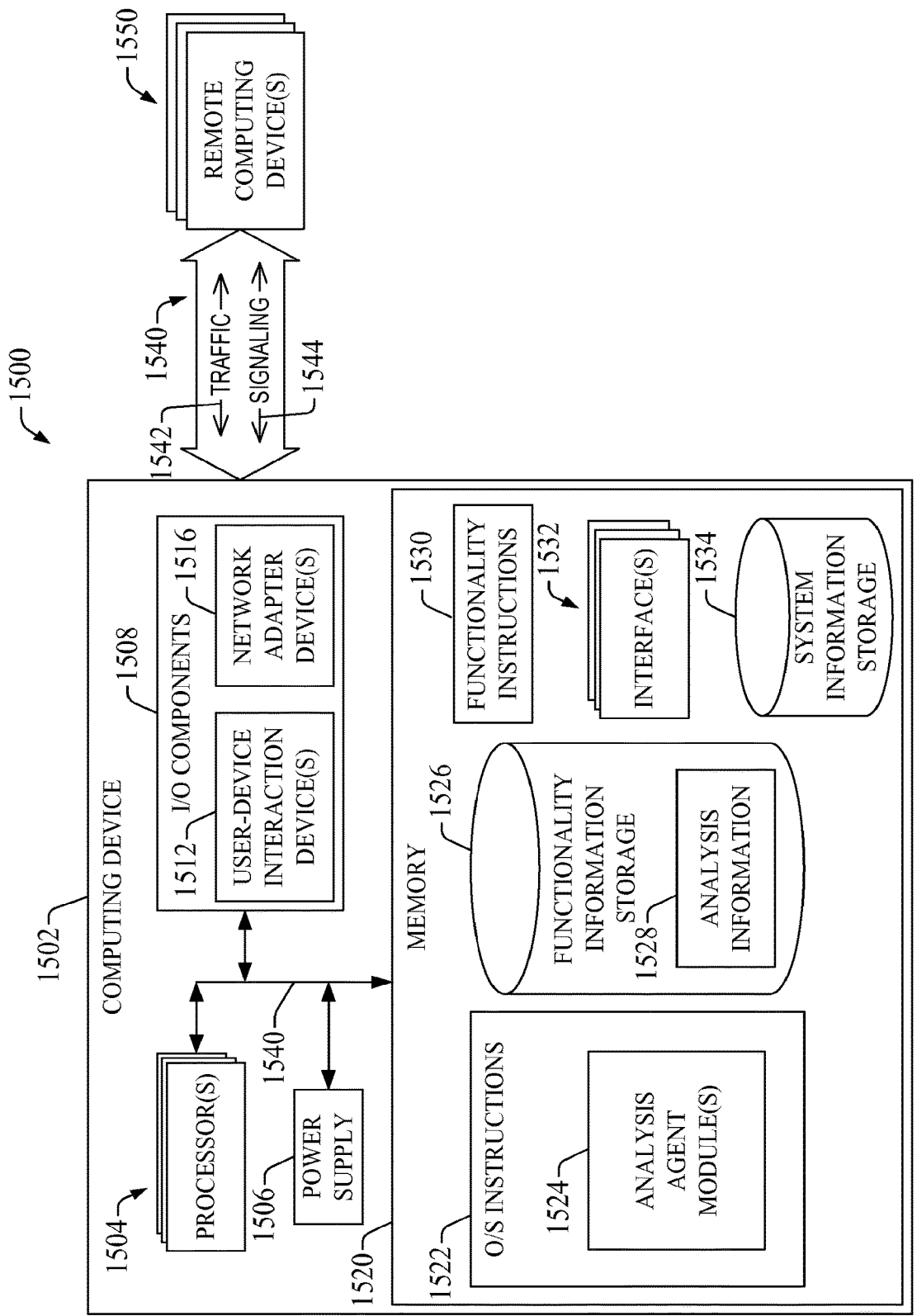
FIG. 15 presents an example of a computing environment in which functionality associated with assessment of operational state of a computing component can be implemented in accordance with one or more embodiments of the disclosure.

In order to provide additional context for various aspects of this disclosure, FIG. 15 illustrates a block diagram of an example of an operational environment 1500 for assessment of operational state of a computing component in accordance with one or more aspects of the disclosure. The example operational environment is merely illustrative and is not intended to suggest or otherwise convey any limitation as to the scope of use or functionality of the operating environment's architecture. In addition, the illustrative operational environment 1500 depicted in FIG. 15 should not be interpreted as having any dependency or requirement relating to any one or combination of components illustrated as part of the operational environment 1500. As illustrated, the operational environment 1500 includes a computing device 1502 and one or more remote computing devices 1550, where such devices are operatively coupled by a communication environment 1540 including communications links and/or a network. In one embodiment, the computing device 1502 can correspond to the host device 150 and one of the remote computing device(s) 1550 can embody or can include the management component I/O. In another embodiment, the computing device 1502 can correspond to the host device 210 and one of the remote computing device(s) 1550 can embody or can include the management component I/O. In yet another embodiment, the computing device 1502 can correspond to the host device 310 and one of the remote computing device(s) 1550 can embody or can include the management component I/O. In still another embodiment, the computing device 1502 can correspond to the host device 410 and one of the remote computing device(s) 1550 can embody or can include the management component I/O. In a further embodiment, the computing device 1502 can correspond to the host device 510 and one of the remote computing device(s) 1550 can embody or can include the management component I/O. The operational environment 1500 also includes one or more remote computing devices 1550 and, in some embodiments, the computing device 1502 and the remote computing device(s) 1550 can embody or can constitute a combination of the management component I/O, the host device 150, and the host device(s) 130.

The operational environment 1500 represents an example implementation of various aspects of the disclosure in which the processing or execution of operations described in connection with the assessment of an operational state of a computing component (e.g., a host device, an application, a VM, or a container) as disclosed herein can be performed in response to execution of one or more software components at the computing device 1502 and/or at least one of the remote computing device(s). It should be appreciated that the one or more software components can render the computing device 1502, or any other computing device that contains such components, a particular machine for assessment of operation states of a computing component as described herein, among other functional purposes. As described herein, a software component can be embodied in or can include one or more computer-accessible instructions, e.g., computer-readable and/or computer-executable instructions (e.g., programming code instructions. In one scenario, at least a portion of the computer-accessible instructions can embody and/or can be executed to perform or otherwise facilitate at least a part of one or more of the example methods described herein, such as the example methods presented in FIGS. 8-12. For instance, to embody one such method, at least a portion of the computer-accessible instructions can be persisted (e.g., stored and/or made available) in a computer-readable storage device and executed by a processor. The computer-accessible instructions that embody or constitute a software component can be assembled into one or more program modules that can be compiled, linked, and/or executed at the computing device 1502 or other computing devices (e.g., at least one of the remote computing device(s) 1550). Generally, such program modules include computer code, routines, programs, objects, components, information structures (e.g., data structures and/or metadata structures), etc., that can perform particular tasks (e.g., one or more operations) in response to execution by one or more processors, which can be integrated into the computing device 1502 or can be functionally coupled thereto.

The various example embodiments of the disclosure can be operational with numerous other general purpose or special purpose computing system environments or configurations. Examples of well-known computing systems, environments, and/or configurations that can be suitable for implementation of various aspects of the disclosure in connection with the assessment of operational states of a computing component as described herein can include a network of personal computers, server computers, and/or distributed computing environments that include any combination of the above systems or devices. Personal computers can include desktop computers, laptop computers, handheld computing devices, and/or wearable computing devices. A server computer can be embodied in a mainframe computer or another type of multiprocessor computing device, a blade server computer, or a personal computer. In one example, in a distributed computing environment, some operations for assessment of operational state of a computing component can be performed at the computing device 1502 and other operations can be performed at one or more of the remote computing device(s) 1550. Therefore, in the distributed computing environment, program modules can be located in both local and remote computer-readable storage devices.

As illustrated, the computing device 1502 can include one or more processors 1504, one or more I/O components 1508, one or more memory devices 1520 (herein referred to generically as memory 1520), and a bus architecture 1540 (also referred to as bus 1540) that operatively couples various functional elements of the computing device 1502. At least one of the remote computing device(s) 1550 can have similar or identical architecture to that of the computing device 1502. The bus 1540 can include at least one of a system bus, a memory bus, an address bus, or a message bus, and can permit exchange of information (data, metadata, and/or signaling) between the processor(s) 1502, the I/O components 1508, and/or the memory 1520, or respective functional elements therein. In certain scenarios, the bus 1540 in conjunction with one or more internal programming interfaces 1532 (also referred to as interface(s) 1532) can permit such exchange of information. At least of the interface(s) 1532 can be embodied in an application programming interface (API). In scenarios in which processor(s) 1504 include multiple processors, the computing device 1502 can utilize parallel computing.

The I/O components 1508 can permit communication of information between the computing device and an external device, such as another computing device. Such communication can include direct communication or indirect communication, such as exchange of information between the computing device 1502 and the external device via a network or elements thereof. As illustrated, the I/O components 1508 can include one or more of network adapter devices 1516 and one or more user-device interaction devices 1512. The network adapter device(s) 1516 can permit or otherwise facilitate connectivity between the external device and one or more of the processor(s) 1504 or the memory 1520. For example, the network adapter device(s) 1516 can include a group of ports, which can comprise at least one of parallel ports, serial ports, Ethernet ports, V.35 ports, or X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394. In another example, the network adapter device(s) 1516 can include a radio unit. The radio unit can include one or more antennas and a communication processing unit that can permit wireless communication between the computing device 1502 and another device, such as one of the remote computing device(s) 1550.

At least one of the network adapter device(s) 1516 can operatively couple the computing device 1502 to the remote computing devices 1550 via a communication environment 1540, which can include a traffic pipe and a signaling pipe that can permit or otherwise facilitate, respectively, the exchange of traffic 1542 and signaling 1544 between the computing device 1502 and the remote computing device(s) 1550. Such a networking provided or otherwise facilitated by the at least one of the network adapter devices(s) 1516 can be implemented in a wired environment, a wireless environment, or a combination of both. The information that is communicated by the at least one of the network adapter device(s) 1516 can result from implementation of one or more operations in a method of the disclosure. For instance, the information can include the signaling 118 described herein. In certain scenarios, each of the remote computing device(s) 1550 can have substantially the same architecture as the computing device 1502.

With further reference to the I/O components 1508, the user-device interaction device(s) 1512 can include functional elements (e.g., lights, such as light-emitting diodes; a display device, such as liquid crystal display (LCD), a plasma monitor, a light emitting diode (LED) monitor, an electrochromic monitor; combinations thereof or the like) that can permit control of the operation of the computing device 1502, or can permit conveying or otherwise revealing the operational conditions of the computing device 1502.

The bus 1540 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, a Universal Serial Bus (USB) and the like. The bus 1540, and all buses described herein can be implemented over a wired or wireless network connection and each of the subsystems, including the processor(s) 1504, the memory 1520 and memory elements therein, and the I/O components 1508 can be contained within one or more remote computing devices 1550 at physically separate locations, connected through buses of this form, thereby effectively implementing a fully distributed system.

The computing device 1502 can include a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 1502, and can include, for example, both volatile and non-volatile media, and removable and/or non-removable media. In one aspect, the memory 1520 can comprise computer-readable media in the form of volatile memory, such as random access memory (RAM), and/or non-volatile memory, such as read-only memory (ROM).

As illustrated, the memory 1520 can include functionality instructions 1530 and functionality information storage 1526. The functionality instructions 1530 can include computer-accessible instructions that embody software applications, libraries, and the like. Such computer-accessible instructions can implement a number of functionalities associated with the computing device 1502 in response to execution by at least one of the processor(s) 1504. For example, the functionality instructions 1530 can embody or can include the hypervisor component 320. In addition or for another example, the functionality instructions 1530 can embody or can include the container manager component 420. In addition, the memory 1520 can include 0/S instructions 1522 that can include one or more analysis agent modules 1524 that can implement one or more of the functionalities of the disclosure in response to execution by at least one of the processor(s) 1504. Each of the analysis agent module(s) 1524 can be embodied in computer-accessible instructions configured to be executed by at least one of the processor(s) 1504. In one scenario, execution of at least one of the analysis agent module(s) 1524 can implement one or more of the methods described herein. For instance, such execution can cause or otherwise direct a processor that executes the at least one module to carry out a disclosed example method. It should be appreciated that, in one implementation, a processor of the processor(s) 1504 that executes at least one of the analysis agent module(s) 1524 can access or otherwise obtain information from or can retain information in a memory element 1528 in the functionality information storage 1526 in order to operate in accordance with the functionality programmed or otherwise configured by the analysis agent module(s) 1524. Such information can include at least one of code instructions, information structures, or the like. For instance, at least a portion of such information can be indicative or otherwise representative of rules associated with tests pertaining to assessment of operational states of a computing device associated with the computing device 1502.

At least a portion of the analysis agent module(s) 1524 and/or at least a portion of the analysis information 1528 can program or otherwise configure one or more of the processors 1502 to operate at least in accordance with the functionality described herein. In one embodiment, the analysis agent module(s) 1524 can embody or can include the assessment module 156, including monitor component 158 and analysis component 160. As described herein, execution of at least a portion of the analysis agent module(s) 1524 can direct at least one processor (e.g., one or more of processor(s) 1504) to perform a group of operations comprising the operations or blocks described in connection with the methods of this disclosure.

In addition to including the analysis agent module(s) 1524, the 0/S instructions 1522 can include computer-accessible instructions that can permit or otherwise facilitate operation and/or administration (e.g., upgrades, software installation, any other configuration, or the like) of the computing device 1502. Accordingly, the 0/S instruction(s) 1522 that can include program modules that embody or include one or more operating systems, such as a Windows operating system, Unix, Linux, Symbian, Android, Chromium, or substantially any 0/S suitable for operation of a computing device. In one aspect, the operational and/or architectural complexity of the computing device 1502 can dictate a suitable 0/S. The memory 1520 also includes a system information storage 1534 having data and/or metadata that permits or otherwise facilitates operation and/or administration of the computing device 1502. Elements of the OS instruction(s) 1522 and the system information storage 1534 can be accessible or can be operated on by at least one of the processor(s) 1504.

At least one of the interface(s) 1532 (e.g., one or more APis) can permit or otherwise facilitate communication of information between two or more components within the functionality instructions storage 1530 and/or two or more components within the 0/S instructions 1522. The information that is communicated by the at least one interface can result from implementation of one or more operations in a method of this disclosure. In some embodiments, one or more of the functionality instructions 1530, the 0/S instructions 1522, and the functionality information storage 1526 can be encoded or otherwise retained in removable/non-removable, and/or volatile/non-volatile computer-readable storage devices.

It is noted that while the 0/S instructions 1522 and the functionality instructions 1530 are illustrated herein as discrete blocks, such software components can reside at various times in different memory components of the computing device 1504, and can be executed by at least one of the processor(s) 1504. In certain scenarios, an implementation of the analysis agent module(s) 1524 can be retained on or transmitted across some form of computer-readable media.

The computing device 1502 can include a power supply 1506 that can energize one or more functional elements that operate within the computing device 1502. In one example, the power supply 1506 can include one or more transformers to achieve power level(s) to operate the computing device 1502 and the functional elements and related circuitry therein. The power supply 1506 can be embodied in or can include a rechargeable or non-rechargeable battery. Accordingly, the power supply 1506 can attach to a conventional power grid in order to recharge and/or or to ensure that the computing device 1502 is operational. To that end, one of the network adapter device(s) 1516 can include a connector to functionally attach the power supply 1506, via the bus 1540, for example, to the conventional power grid. In addition or in other embodiments, the power supply 1506 can include an energy conversion component (not shown) such as a solar panel, a thermoelectric device or material, and/or another type of energy storage material in order to provide additional or alternative power resources or autonomy to the computing device 1502.

The computing device 1502 can operate in a networked environment by utilizing connections to one or more of the remote computing device(s) 1550. As an illustration, a remote computing device can be a personal computer, a portable computer, a server, a router, a network computer, a peer device or other common network node, and so on. As described herein, connections (physical and/or logical) between the computing device 1502 and a remote computing device of the remote computing device(s) 1550 can be made via the communication environment 1540 which can form a local area network (LAN), a wide area network (WAN), and/or other types of networks. Such networking environments can be deployed in dwellings, offices, enterprise-wide computer networks, intranets, local area networks, and wide area networks.

As described herein, in one or more embodiments, one or more of the functionality described herein can be implemented in distributed computing environments, such as cloud-computing environments. In a distributed computing environment, in one aspect, one or more software components (such as the analysis agent module(s) 1524) can be located in both the computing device 1502 and at least one of the remote computing device(s) 1550, for example. It should be appreciated that in such distributed environments, the functionality for assessment of performance state of a computing device can be implemented by a system constituted at least by the computing device 1502 and at least one of the remote computing device(s) 1550. Such a system can embody or can contain at least a portion of the example operational environment 100.

In the present description, for purposes of explanation, numerous specific details have been set forth in order to provide a thorough understanding of the disclosure. It may be evident, however, that the subject disclosure may be practiced without these specific details. In other instances, well-known structures and devices are shown in block diagram form in order to facilitate describing the subject disclosure.

As used in this disclosure, including the annexed drawings, the terms "component," "system," "platform," "environment," "unit," "interface," and the like are intended to refer to a computer-related entity or an entity related to an operational apparatus with one or more specific functionalities, wherein the entity can be either hardware, a combination of hardware and software, software, or software in execution. One or more of such entities are also referred to as "functional elements." As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include I/O components as well as associated processor, application, or Application Programming Interface (API) components. While the foregoing examples are directed to aspects of a component, the exemplified aspects or features also apply to a system, platform, interface, node, coder, decoder, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

The term "processor," as utilized in this disclosure, can refer to any computing processing unit or device comprising, but not limited to comprising, single-core processors; single-processors with software multithread execution capability; multi-core processors; multicore processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. Moreover, a memory component can be removable or affixed to a functional element (e.g., device, server).

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various embodiments described herein can be implemented as a method, apparatus, or article of manufacture using standard programming and/or engineering techniques. In addition, various of the aspects disclosed herein also can be implemented by means of program modules or other types of computer program instructions stored in a memory device and executed by a processor, or other combination of hardware and software, or hardware and firmware. Such program modules or computer program instructions can be loaded onto a general purpose computer, a special purpose computer, or another type of programmable data processing apparatus to produce a machine, such that the instructions which execute on the computer or other programmable data processing apparatus create a means for implementing the functionality of disclosed herein.

The term "article of manufacture" as used herein is intended to encompass a computer program accessible from any computer-readable device, carrier, or media. For example, computer readable media can include but are not limited to magnetic storage devices (e.g., hard drive disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

What has been described above includes examples of systems and methods that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method comprising:
   collecting, by a server device that is executing within a server device cluster, metric information indicative of an operational state of the server device, wherein the metric information is associated with a plurality of virtual computing instances executing on the server device;
   receiving, by the server device, input information indicative of a selection of a scope of test, wherein the scope of test includes a first virtual computing instance and a second virtual computing instance included within the plurality of virtual computing instances executing on the server device;
   analyzing, by the server device and based on the metric information, whether a first condition associated with the first virtual computing instance is satisfied;
   analyzing, by the server device and based on the metric information, whether a second condition associated with the second virtual computing instance is satisfied;
   determining, by the server device, whether a compound rule is satisfied by evaluating whether the first condition associated with the first virtual computing instance and the second condition associated with the second virtual computing instance are both met, wherein determining whether the compound rule is satisfied includes focusing the evaluation on virtual computing instances within the scope of test in order to mitigate operational overhead of the server device, and wherein determining whether the compound rule is satisfied includes computing an aggregation function result for each of a specific number of monitoring intervals, determining a count of monitoring intervals in which the aggregation function result exceeds an aggregation function threshold, and determining whether the count exceeds a count threshold; and
   updating control information characterizing the operational state of the server device executing within the server device cluster.

2. The method of claim 1,
   wherein updating control information characterizing the operational state of the server device comprises generating event information indicative of determining that both the first condition and the second condition are satisfied.

3. The method of claim 1,
   wherein updating the control information characterizing the operational state comprises generating alarm information indicative of an active alarm condition.

4. The method of claim 1, further comprising:
   receiving, by the server device and from a remote computing device, configuration information defining the compound rule associated with the first condition and the second condition.

5. The method of claim 1, wherein updating control information includes:
   determining whether an event mode is configured for at least one of the first virtual computing instance executing on the server device and the second virtual computing instance executing on the server device; and
   in response to determining that the event mode is configured, generating event information indicative of occurrence of the first condition.

6. The method of claim 1, wherein updating control information includes:
   determining that an alert mode is configured for at least one of the first virtual computing instance executing on the server device and the second virtual computing instance executing on the server device; and
   in response to determining that the alert mode is configured:
   determining whether an alert associated with the first condition is active, and
   generating alarm information indicative of an active alarm condition in response to determining that the alert associated with the first condition is not active.

7. The method of claim 1,
   wherein the first virtual computing instance and the second virtual computing instance are each a virtual machine.

8. The method of claim 1,
   wherein the first virtual computing instance and the second virtual computing instance are each a container.

9. The method of claim 1,
   wherein collecting the metric information comprises monitoring at least one of central processing unit (CPU) usage, CPU time, memory usage, hard drive disk usage, available inbound network bandwidth, available outbound network bandwidth, time to first byte associated with a request for service, or a number of requests for service.

10. A system comprising:
    a storage system; and
    processing circuitry in a server device that is executing within a server device cluster, wherein the processing circuitry has access to the storage system and is configured to cause the server device to:
    receive input information indicative of a selection of a scope of test, wherein the scope of test includes a first virtual computing instance and a second virtual computing instance included within a plurality of virtual computing instances executing on the server device;
    collect a first set of metric information associated with the first virtual computing instance executing on the server device,
    collect a second set of metric information associated with the second virtual computing instance executing on the server device,
    analyze, based on the first set of metric information, whether a first condition associated with the first virtual computing instance is satisfied,
    analyze, based on the second set of metric information, whether a second condition associated with the second virtual computing instance is satisfied,
    determine whether a compound rule is satisfied by evaluating whether the first condition associated with the first virtual computing instance and the second condition associated with the second virtual computing instance are both met, wherein determining whether the compound rule is satisfied includes focusing the evaluation on virtual computing instances within the scope of test in order to mitigate operational overhead of the server device, and wherein determining whether the compound rule is satisfied includes computing an aggregation function result for each of a specific number of monitoring intervals, determining a count of monitoring intervals in which the aggregation function result exceeds an aggregation function threshold, and determining whether the count exceeds a count threshold, and
    update control information characterizing an operational state of the server device executing within the server device cluster.

11. The system of claim 10, wherein to update control information characterizing the operational state of the server device, the processing circuitry is further configured to cause the server device to:
  generate event information indicative of determining that both the first condition and the second condition are satisfied.

12. The system of claim 10, wherein to update control information characterizing the operational state of the server device, the processing circuitry is further configured to cause the server device to:
  generate alarm information indicative of an active alarm condition.

13. The system of claim 10, wherein the processing circuitry is further configured to cause the server device to:
  receive, from a remote computing device, configuration information defining the compound rule associated with the first condition and the second condition.

14. The system of claim 10, wherein to update control information characterizing the operational state of the server device, the processing circuitry is further configured to cause the server device to:
  determine whether an event mode is configured for at least one of the first virtual computing instance executing on the server device and the second virtual computing instance executing on the server device; and
  in response to determining that the event mode is configured, generate event information indicative of occurrence of the first condition.

15. The system of claim 10, wherein to update control information characterizing the operational state of the server device, the processing circuitry is further configured to cause the server device to:
  determine that an alert mode is configured for at least one of the first virtual computing instance executing on the server device and the second virtual computing instance executing on the server device; and
  in response to determining that the alert mode is configured:
    determine whether an alert associated with the first condition is active, and
    generate alarm information indicative of an active alarm condition in response to determining that the alert associated with the first condition is not active.

16. A non-transitory computer-readable medium comprising instructions for causing processing circuitry to perform operations comprising:
  receiving input information indicative of a selection of a scope of test, wherein the scope of test includes a first virtual computing instance and a second virtual computing instance included within a plurality of virtual computing instances executing on a server device that is executing within a server device cluster;
  collecting a first set of metric information associated with the first virtual computing instance executing on a server device;
  collecting a second set of metric information associated with the second virtual computing instance executing on the server device;
  analyzing, based on the first set of metric information, whether a first condition associated with the first virtual computing instance is satisfied;
  analyzing, based on the second set of metric information, whether a second condition associated with the second virtual computing instance is satisfied;
  determining whether a compound rule is satisfied by evaluating whether the first condition associated with the first virtual computing instance and the second condition associated with the second virtual computing instance are both met, wherein determining whether the compound rule is satisfied includes focusing the evaluation on virtual computing instances within the scope of test in order to mitigate operational overhead of the server device, and wherein determining whether the compound rule is satisfied includes computing an aggregation function result for each of a specific number of monitoring intervals, determining a count of monitoring intervals in which the aggregation function result exceeds an aggregation function threshold, and determining whether the count exceeds a count threshold; and
  updating control information characterizing an operational state of the server device executing within the server device cluster.

* * * * *